United States Patent
Hod

(10) Patent No.: US 12,547,743 B2
(45) Date of Patent: Feb. 10, 2026

(54) METHOD AND APPARATUS FOR AUTOMATED DIGITAL RIGHTS ENFORCEMENT AND MANAGEMENT METHODS

(71) Applicant: Zohar Hod, Haworth, NJ (US)

(72) Inventor: Zohar Hod, Haworth, NJ (US)

(73) Assignee: Zohar Hod, Haworth, NJ (US)

( * ) Notice: Subject to any disclaimer, the term of this patent is extended or adjusted under 35 U.S.C. 154(b) by 1076 days.

(21) Appl. No.: 17/489,369

(22) Filed: Sep. 29, 2021

(65) Prior Publication Data

US 2022/0100875 A1  Mar. 31, 2022

Related U.S. Application Data

(60) Provisional application No. 63/193,543, filed on May 26, 2021, provisional application No. 63/162,426, filed on Mar. 17, 2021, provisional application No. 63/198,132, filed on Sep. 30, 2020.

(51) Int. Cl.
| | |
|---|---|
| *G06F 21/60* | (2013.01) |
| *G06F 21/10* | (2013.01) |
| *G06F 21/62* | (2013.01) |
| *G06N 20/00* | (2019.01) |

(52) U.S. Cl.
CPC ............ *G06F 21/604* (2013.01); *G06F 21/10* (2013.01); *G06F 21/6218* (2013.01); *G06N 20/00* (2019.01); *G06F 2221/2111* (2013.01); *G06F 2221/2141* (2013.01)

(58) Field of Classification Search
CPC .... G06F 21/604; G06F 21/3218; G06F 21/10; G06F 2221/2111; G06F 2221/2141

USPC .......................................................... 726/26
See application file for complete search history.

(56) References Cited

U.S. PATENT DOCUMENTS

| | | | |
|---|---|---|---|
| 9,626,668 B2* | 4/2017 | Raley | G06Q 20/382 |
| 10,022,613 B2* | 7/2018 | Tran | G06Q 20/321 |
| 11,423,498 B2* | 8/2022 | Kraemer | G06Q 50/184 |
| 2005/0216419 A1* | 9/2005 | Lee | G06F 21/606 |
| | | | 705/59 |
| 2007/0112676 A1* | 5/2007 | Kontio | G06Q 20/3674 |
| | | | 705/50 |

(Continued)

OTHER PUBLICATIONS

Asaph Azaria, "MedRec: Using Blockchain for Medical Data Access and Permission Management" 2016 IEEE (Year: 2016).*

*Primary Examiner* — Samson B Lemma
(74) *Attorney, Agent, or Firm* — Gearhart Law LLC

(57) ABSTRACT

Methods and apparatus for secure data digital rights processing, distribution, and monetization through the use of Smart Contracts as input to a machine learning module (MLM) to manage and enforce digital rights across multiple ecosystems. One embodiment of the invention includes a digital data rights server configured to communicate with a distributed ledger technology (DLT) or a centralized database (DB). In addition, a Smart Contract layer may integrate on top of the DB API and be responsible for the sole control of the owner's digital data rights. The Smart Contract layer is configured to track party's privy to the data, the legal rights and obligations of such parties, the value of the digital rights data, and the automatic provisioning of digital rights data based on the rules set in advance by the digital rights data owner as digital rights data moves to the next generation of digital rights data subscriber.

14 Claims, 21 Drawing Sheets

(56) References Cited

U.S. PATENT DOCUMENTS

| | | | | |
|---|---|---|---|---|
| 2008/0091613 | A1* | 4/2008 | Gates | G06Q 30/0601 |
| | | | | 705/59 |
| 2010/0024000 | A1* | 1/2010 | Holtzman | H04L 9/3268 |
| | | | | 726/2 |
| 2013/0276146 | A1* | 10/2013 | Gilani | H04L 63/10 |
| | | | | 726/29 |
| 2015/0356277 | A1* | 12/2015 | Barber | G06F 21/10 |
| | | | | 726/28 |
| 2015/0358333 | A1* | 12/2015 | Cronin | H04L 63/0861 |
| | | | | 726/7 |
| 2015/0379510 | A1* | 12/2015 | Smith | G06F 21/64 |
| | | | | 705/71 |
| 2016/0217436 | A1* | 7/2016 | Brama | G06Q 20/10 |
| 2016/0283920 | A1* | 9/2016 | Fisher | H04L 9/3239 |
| 2017/0041296 | A1* | 2/2017 | Ford | G06F 21/64 |
| 2017/0116693 | A1* | 4/2017 | Rae | G06Q 50/184 |
| 2019/0253431 | A1* | 8/2019 | Atanda | G06F 21/62 |
| 2020/0143367 | A1* | 5/2020 | LeBeau | G06F 21/64 |
| 2020/0177579 | A1* | 6/2020 | Allen | H04L 9/3239 |
| 2021/0089677 | A1* | 3/2021 | Qian | G06F 21/6227 |
| 2021/0256070 | A1* | 8/2021 | Tran | G06F 16/9536 |
| 2022/0100875 | A1* | 3/2022 | Hod | G06F 21/604 |

\* cited by examiner

METHOD AND APPARATUS FOR AUTOMATED DIGITAL RIGHTS ENFORCEMENT AND MANAGEMENT METHODS

PRIORITY CLAIMS

This application claims the benefit of U.S. Provisional Application Ser. No. 63/198,132, filed Sep. 30, 2020, U.S. Provisional Application Ser. No. 63/162,426, filed Mar. 17, 2021, and U.S. Provisional Application Ser. No. 63/193,543, filed May 26, 2021, the contents of which are incorporated herein.

BACKGROUND OF THE INVENTION

The present invention relates to data digital rights processing and distribution, and, more particularly, to a method and apparatus for automated digital rights management workflows comprising decentralized, automated data governance, monetization, and the use of Smart Contracts to manage and enforce digital rights across multiple ecosystems. Today, data ownership and distribution are blurred. People provide their data to others, often with no conception of what rights they may be relinquishing, and with no ability to control what others may do with their data. In doing so, people may lose the ability to control and monetize their own data rights.

Data is constantly given to platforms without limitation to aggregators and entities such as, Bloomberg, Google, Facebook, or the like. These aggregators and entities then may distribute the data on behalf of the owner or in some cases, for their own benefit and profit. Yet, most of these aggregators and entities, and the people providing their data, lack the ability to provide transparency to their users and data contributors to the usage of their data. Aggregator and entities lack an automated way to distribute data to people they do not know, but also lack a way to automate the process of provisioning and monitoring data for the purpose of consumption in real time or on the fly once the data or rights have been consumed and passed on to the next generation of users.

This invention relates to artificial intelligence digital rights management software. More specifically, the present invention relates to computational methods and systems for data digital rights processing, distribution, and automated digital rights management workflows to manage and enforce digital rights across multiple ecosystems using artificial intelligence type software. In the field of computer science, artificial intelligence ("AI") networks, such as neural networks and deep learning networks, are being increasingly employed to solve a variety of tasks and problems. As can be seen, there is a need for a solution to one or more of the foregoing problems. These and other aspects, objects, features and advantages of the present invention, are specifically set forth in, or will become apparent from, the following detailed description of an exemplary embodiment of the invention.

SUMMARY OF THE INVENTION

Described herein is an innovative system and methods directed toward artificial intelligence digital rights management. Further areas of applicability of the present disclosure will become apparent from the detailed description, the claims, and the drawings. The detailed description and specific examples are intended for illustration only and are not intended to limit the scope of the disclosure. Broadly, an embodiment of the present invention provides a method and apparatus for decentralized, automated data digital rights processing and distribution, and more particularly, to a method and apparatus for automated digital rights management workflows and the use of Smart Contracts to manage, enforce, monetize, and distribute digital rights across multiple ecosystems simultaneously. The inventive method and apparatus comprise a Smart Contract layer which sits and integrates on top of the database and may be responsible for the sole control of an owner's data rights.

The method and apparatus of the present invention may include at least one computer with a user interface. The computer may include at least one processing unit coupled to a form of memory. The computer may include, but may not be limited to, a microprocessor, a server, a desktop, a laptop or notebook computer, and smart device, such as, a tablet and smart phone. The computer may include a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform necessarily achieves technological improvements through the specific processes described more in detail below. In addition, the unconventional and unique aspects of these specific automation processes represent a sharp contrast to merely providing a well-known or routine environment for performing a manual or mental task.

The method and apparatus of the present invention provide a needed solution for data digital rights ownership, processing, and distribution, and, more particularly, to a method and apparatus for automated digital rights management workflows and the use of Smart Contracts to manage and enforce digital rights across multiple ecosystems. Today, people provide their data to others, often with no conception of what rights they may be relinquishing, with no ability to control what others may do with their data and likely forfeiting the ability to monetize their own data. In addition, a Data Digital Rights exchange always happens on a bilateral basis. However, our data flows in from many complex dimensions and the demand for a dynamic decentralized rules enforcement mechanism will only increase exponentially. Data is mostly given to aggregators and entities such as, for example without limitation, Bloomberg, Google, Facebook, or the like. These aggregators and entities may then distribute the data on behalf of the owner, or in some cases, for their own benefit and profit. Some aggregators and entities, and many people providing their data, lack not only an automated way to distribute data to people they do not know, but also a way to automate the process of provisioning and monitoring data for the purpose of consumption in real time or on the fly once the data or rights have been consumed and passed onto the next generation of users.

The present invention may resolve the important problems of the blurring of data ownership and distribution, and other potential problems caused by data owners providing their data to others, with inadequate appreciation and control over the possible uses or monetization of the data. The method and apparatus of the present invention may provide an automated process of distributing data to people they do not know which may safeguard the data and provide an unprecedented level of trust. The present invention may provide a method and apparatus capable of automating the process of provisioning and monitoring the data for the purpose of consumption in real time, which may require manual and specific onboarding only to known vetted persons, parties or entities.

These and other aspects, objects, features and advantages of the present invention, are specifically set forth in, or will become apparent from, the following detailed description of an exemplary embodiment of the invention.

BRIEF DESCRIPTION OF THE DRAWINGS

The present disclosure will become better understood from the detailed description and the drawings, wherein.

DETAILED DESCRIPTION OF THE PREFERRED EMBODIMENT

Figure 1:
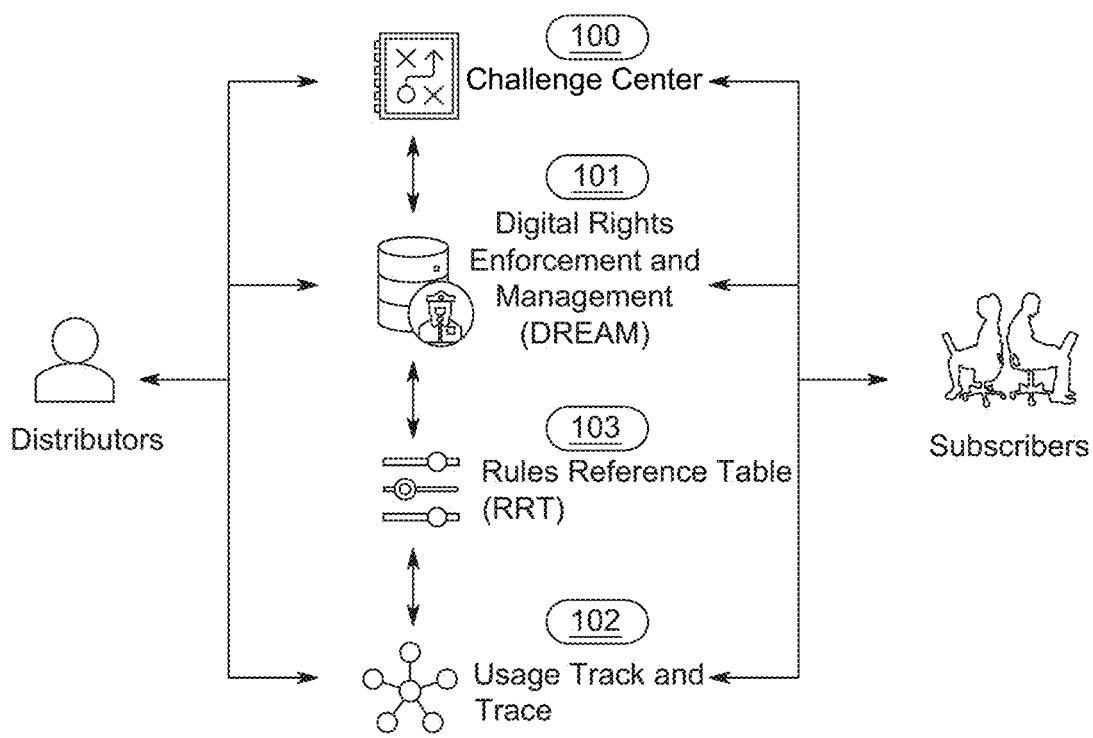
FIG. 1 is a diagram overview of the components of the present invention.

In this specification, reference is made in detail to specific embodiments of the invention. Some of the embodiments or their aspects are illustrated in the drawings.

For clarity in explanation, the invention has been described with reference to specific embodiments, however, it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 diagrams the overall system and components of the present invention. In accordance with the preferred embodiment of the present invention, the challenge center interface 100 communicates directly with the Digital Rights Enforcement and Management (DREAM™) 101, usage track and trace 102, and the rules reference table (RRT) 103. In a preferred embodiment, the challenge center 100 utilizes an underlying distributed ledger technology (DLT) or blockchain related persistence mechanism that uses census protocols, for example, Byzantine Fault protocols (BFT).

Figure 2:
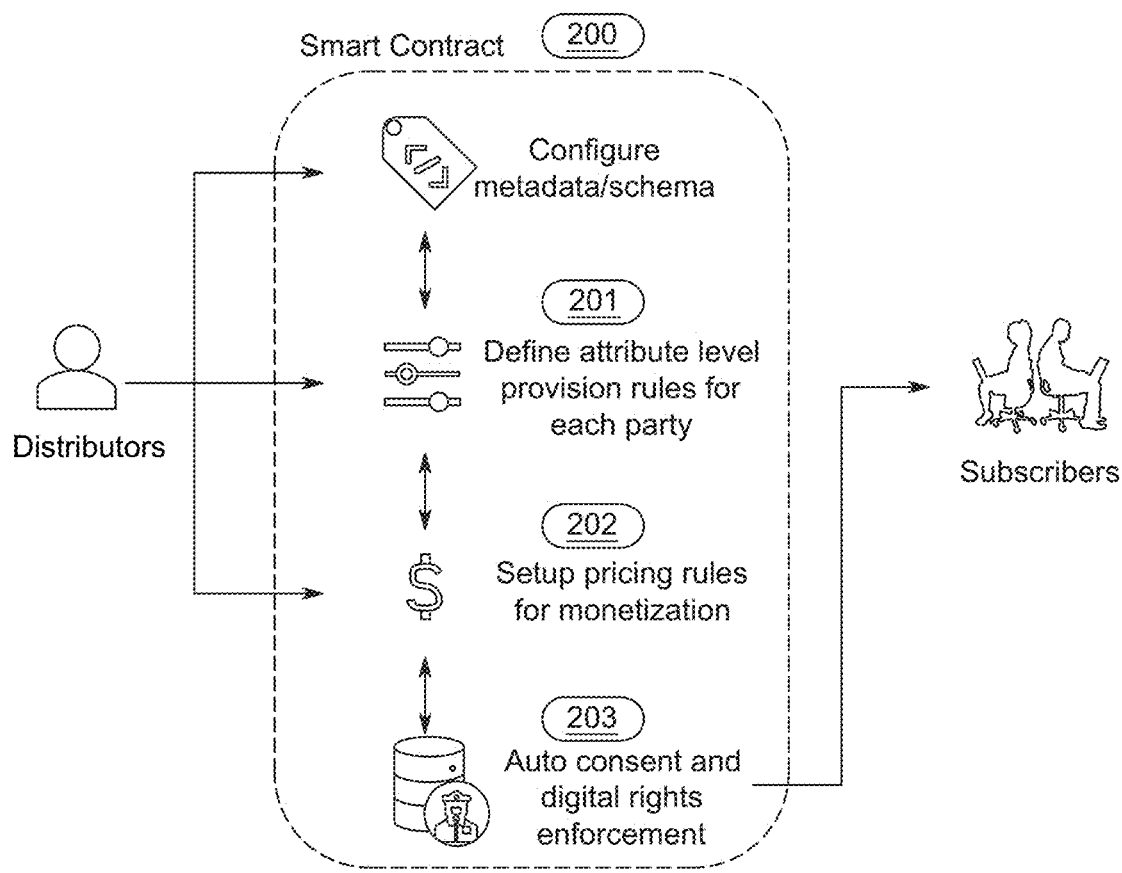
FIG. 2 is a diagram overview of the Smart Contract component of the present invention.

FIG. 2 diagrams the Smart Contract workflow component of the present invention. In accordance with the present invention, all publishing and consumption rules are orchestrated through Smart Contracts 200. The data contributor can define attribute level provision rules for each party 201. Data contributors specify pricing rules for monetization 202 so the Smart Contract can automatically provision data, auto consent, and enforce digital rights 203.

Figure 3:
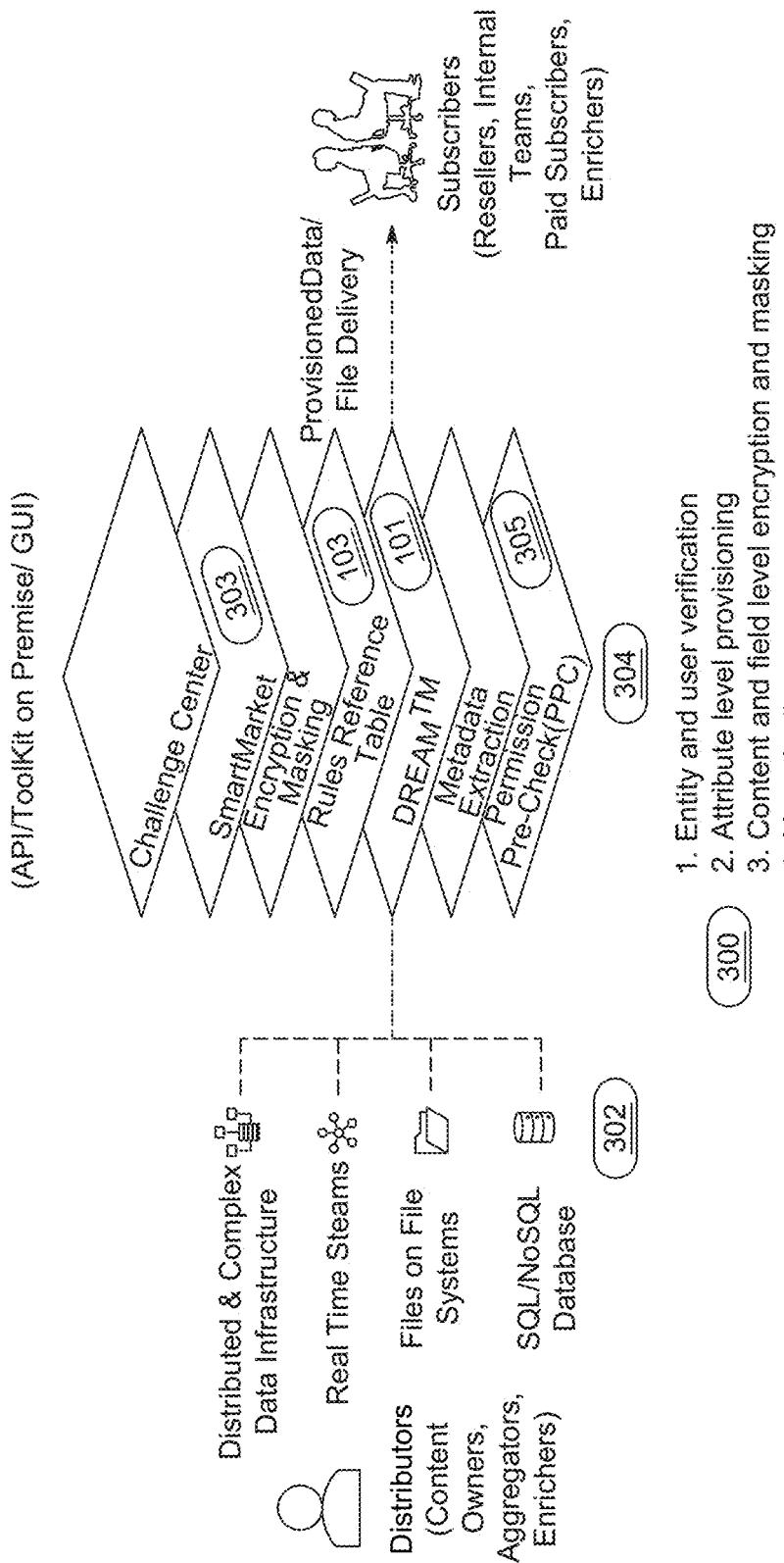
FIG. 3 is a diagram overview of exemplary embodiments of the present invention.

FIG. 3 diagrams the entity and user verification 300, attribute level provisioning 300, content and field level encryption and masking 300, and monetization 300 components of the present invention. In accordance with the preferred embodiment of the present invention, the entity and user verification 300, attribute level provisioning 300, content and field level encryption and masking 300, and monetization 300 components are automated and enforced using a decentralized Smart Contracts platform. The entity and user verification 300, attribute level provisioning 300, content and field level encryption and masking 300, and monetization 300 components communicate with the Digital Rights Enforcement and Management (DREAM™) system 101. The distributed and complex data infrastructure 302, real time streams 302, file on file systems 302, and SQL/NonSQL databases 302 communicate with the DREAM™ Fabric 304. The permission pre-check (PPC) 305 verifies participants information against rules reference tables (RRT) 103 and official sources such as LDAP, LexisNexis, Dun & Bradstreet, and/or other reference data sources 702. In a preferred embodiment, the permission pre-check (PPC) 305 may include a machine learning module (MLM). The MLM may receive data input from the Digital Rights Enforcement and Management (DREAM™) system 101 and perform pattern matching or predictive analytics on the received data to detect incorrect and inconsistent information, as well as potential fraud. Optionally, the data processed by the MLM may be homomorphically encrypted or masked, allowing the MLM to perform training and inferencing upon ciphertext, rather than plaintext. The SmartMarket 303 component automates publishing and data control, transparency of data management and enforcement, provides flexible monetization, and automates consent management.

Figure 4:
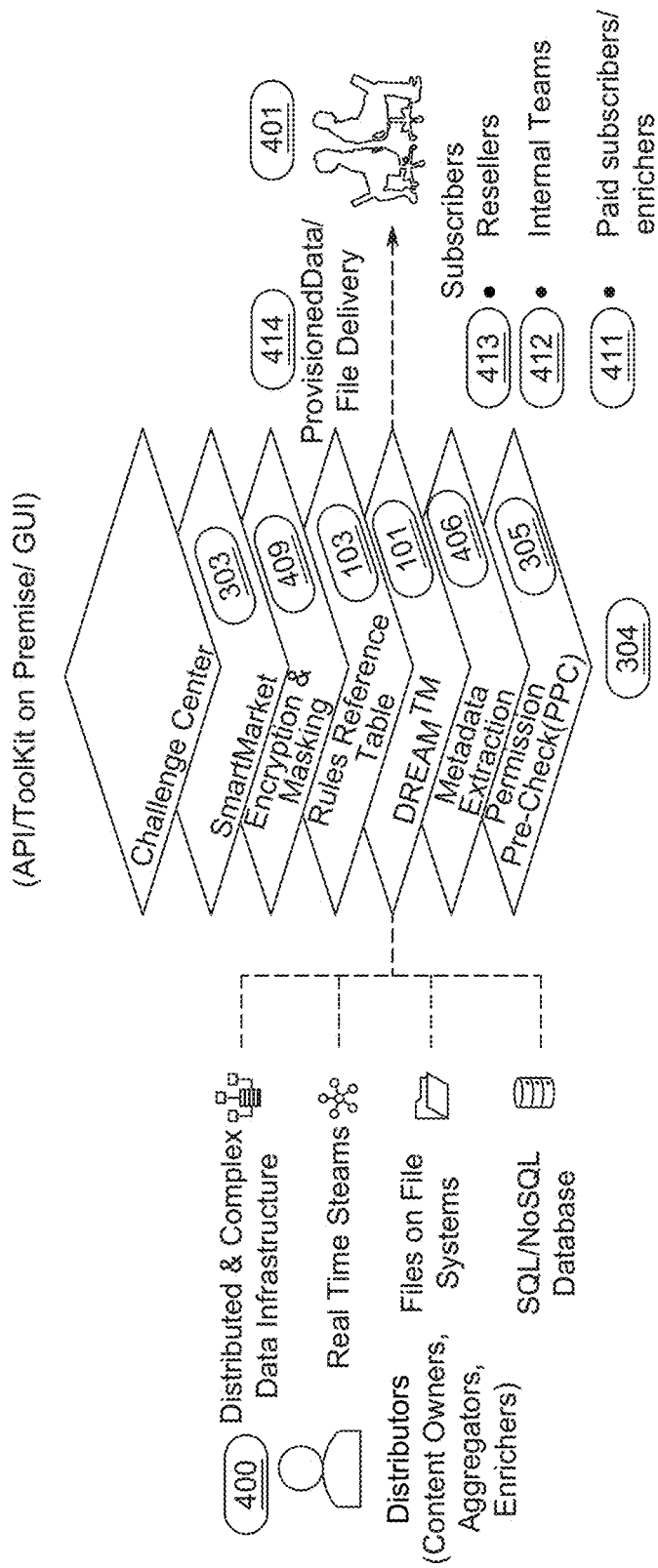
FIG. 4 is a schematic diagram overview of the Digital Rights Enforcement and Management (DREAM™) Fabric component of the present invention.

FIG. 4 diagrams the DREAM™ Fabric workflow component of the present invention. In accordance with the present invention, a distributor (content owner, aggregators, or enrichers) 400 uploads data to the DREAM™ Fabric 304, where a permission pre-check Us (PPC) 305 is performed and sent through the metadata extraction layer 406. The digital rights enforcement and management (DREAM™) 101 layer receives the digital rights data and checks the data with the rules reference table (RRT) 103. The data is then sent to the encryption and masking layer 409 where data is encrypted. The SmartMarket 303 retrieves encrypted digital rights data and executes provisioned data file delivery 414 to subscribers 401, which can consist of resellers 413, internal teams 412, and paid subscribers 411.

Figure 5:
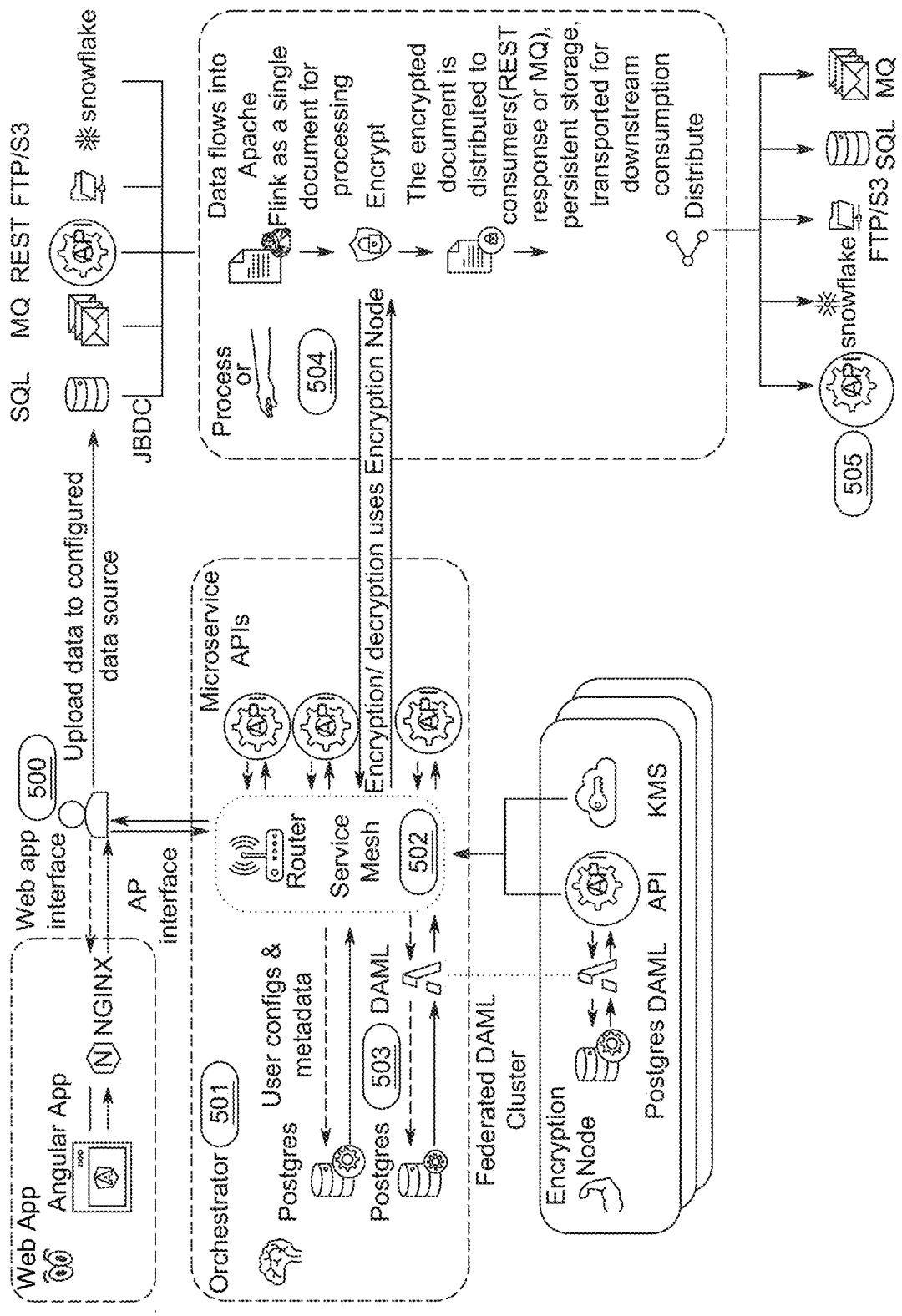
FIG. 5 is a schematic diagram overview of the technical architecture component of the present invention.

FIG. 5 diagrams the technical architecture component of the present invention. In some embodiments, participants with data outside One Creation 500 may upload digital rights metadata to the One Creation Orchestrator 501. Metadata may be retrieved via API calls through a Service Mesh 502 and digital rights enforcement rules may be stored in DAML smart contracts 503. Provisioned data may be encrypted within the Process component 504 and delivered in a variety of ways including, but not limited to, REST API 505. Optionally, each of these components can be deployed and hosted by One Creation (OC), deployed and hosted by clients, or any combination of the two.

Figure 6:
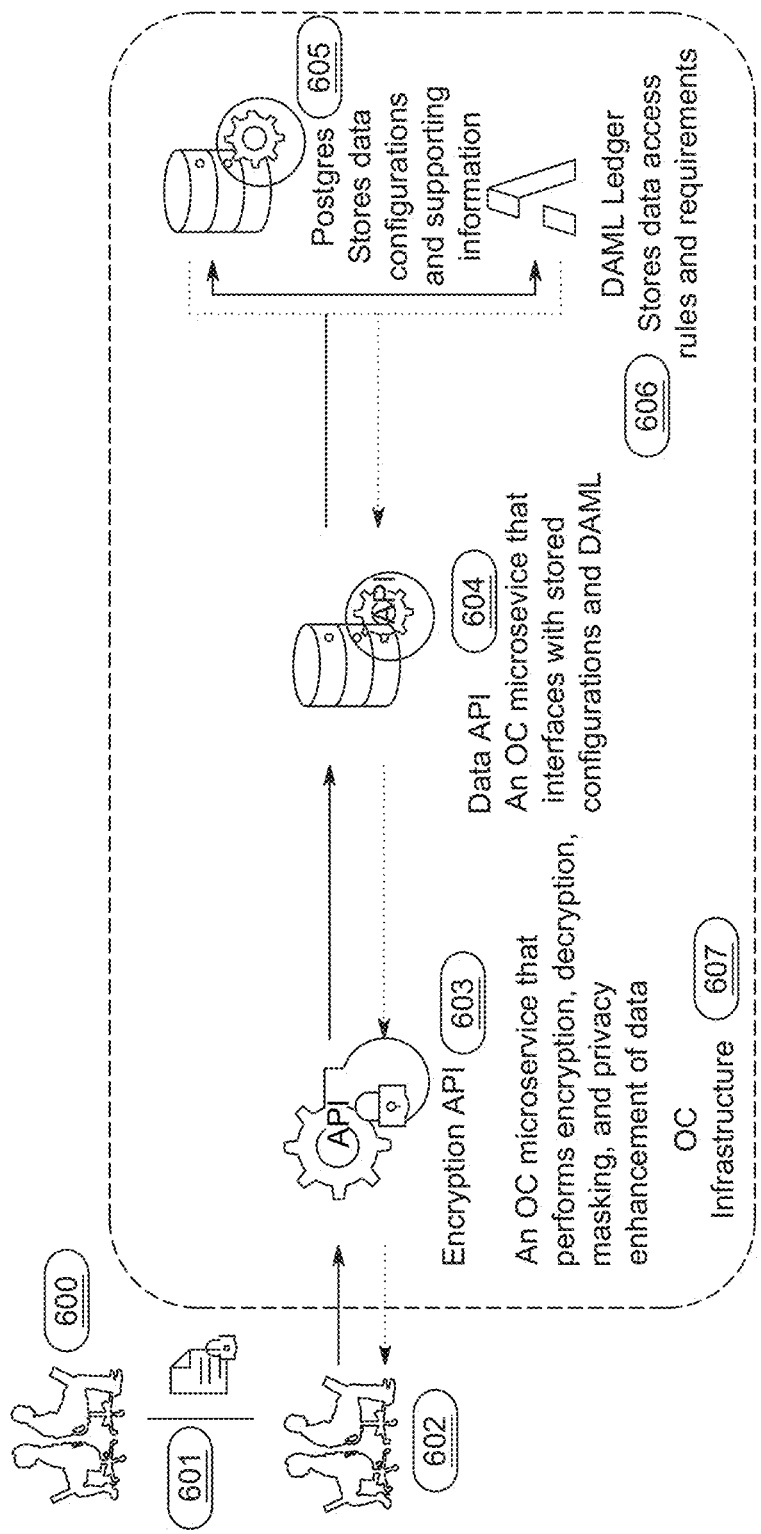
FIG. 6 is a diagram of the access validation component of the present invention.

FIG. 6 diagrams the access validation component of the present invention. A user 600 is given access to an OC-secured file 601. The OC-secured file 601 may be an Excel, Word, PDF, or other type of file. The functionality of the OC-secured file may be performed on behalf of the user 600. In the respective application via macros, while arbitrary data files must be performed programmatically via the OC web-application. The user with an OC-secured file 602 can then send the file to the OC infrastructure 607 where data undergoes the Encryption API service 603. The Encryption API 603 queries the Data API 604 to ensure the requestor is authorized to access the file. The Data API 604 verifies the user's role and access levels in the DAML Ledger 606. Postgres 605 stores data configurations and supporting information. The Encryption API 603 then returns a key and encrypted content to the user 602 for consumption.

Figure 7:
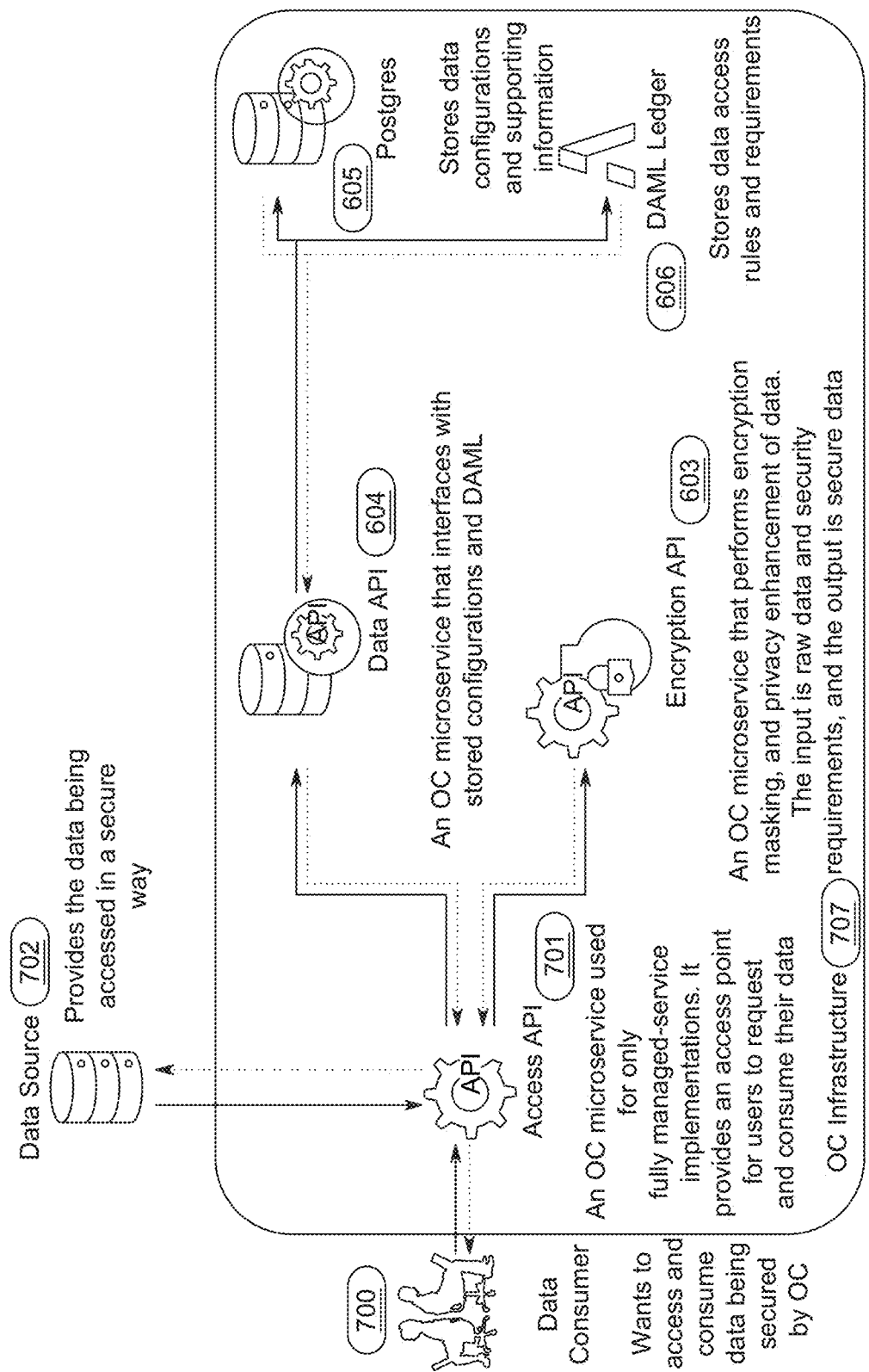
FIG. 7 is a diagram of the secure data consumption request and response of the present invention.

FIG. 7 diagrams the secure data consumption request and response of the present invention. A data consumer 700 can access and consume data being secured by the OC Infrastructure 707. The Access API 701 checks if the data consumer 700 can access the data. The Access API 701 can be an OC microservice used for fully managed-service implementations. The data source 702 provides the data in a secure way to the Access API 701. The Access API 701 can provide an access point for users to request and consume their data. The Data API 604 returns the decision and security rules to apply. If the data consumer 700 can access the data, then the Access API 701 fetches the raw content from the original data source 702. The raw data, along with security requirements are sent to the Encryption API 603. The Encryption API 603 can be an OC Microservice that performs encryption, masking, and privacy enhancement of data. The Encryption API 603 can retrieve raw data and security requirements and output secure data. Postgres 605 stores data configurations and supporting information. The DAML Ledger 606 stores data access rules and requirements.

Figure 8:
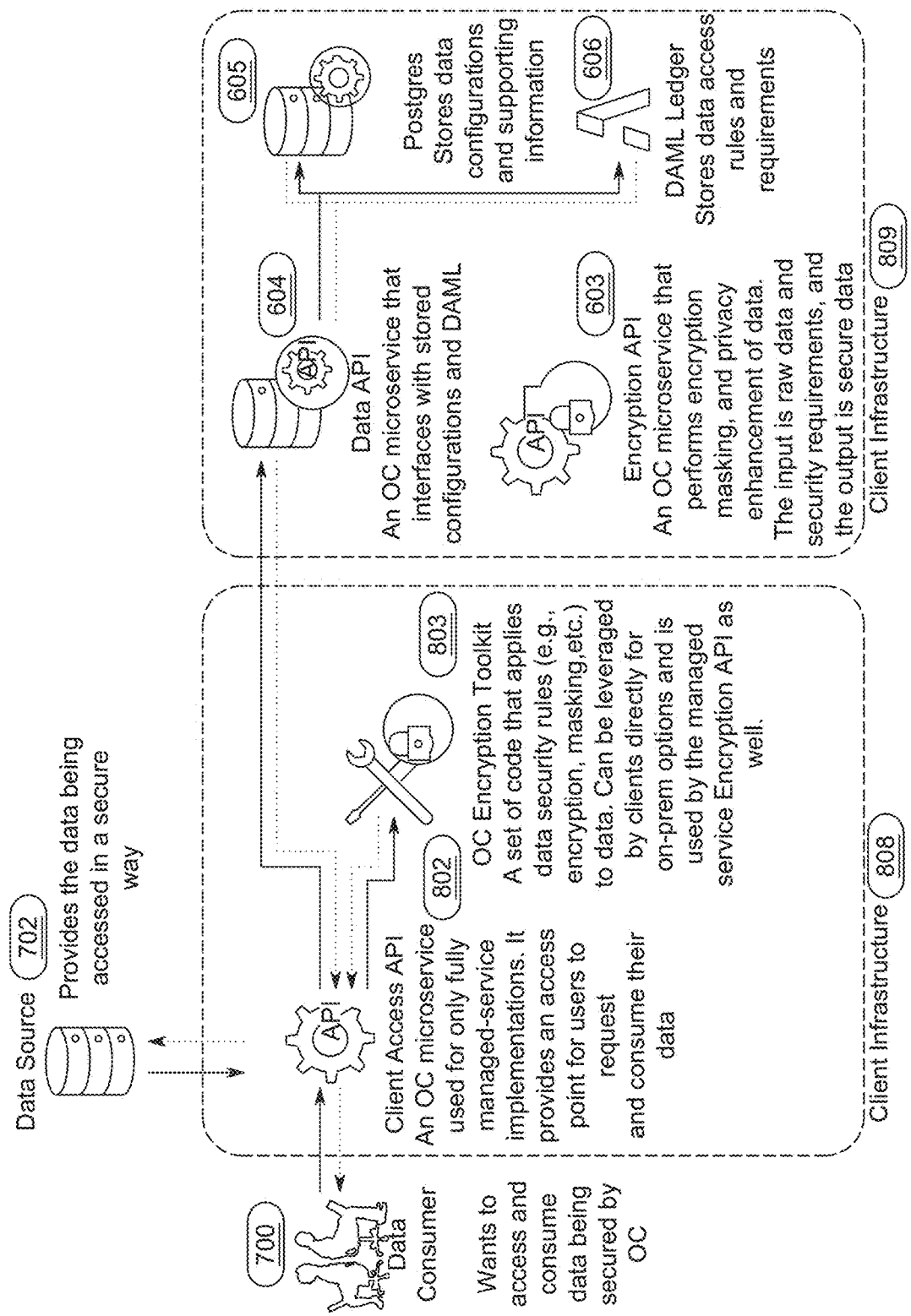
FIG. 8 is a diagram overview of the secure data consumption request and response on-premises component of the present invention.

FIG. 8 diagrams the secure data consumption request and response on-premises component of the present invention. A data consumer 700 can access and consume data being secured by OC through the client infrastructure 808. The data source 702 can provide the data being accessed in a secure way. The Client Access API 802 checks if the data consumer 700 can access the data. The Client Access API 802 can be an OC microservice used for fully managed-service implementations and can provide an access point for users 700 to request and consume their data. The OC Data API 604 returns the decision and security rules to apply. If the data consumer 700 can access the data, then the Client Access API 802 fetches the raw content from the original data source 702. The raw data, along with security requirements, are sent to the OC Encryption Toolkit 803. In the OC Encryption Toolkit 803, a set of code can apply data security rules (e.g., encryption, masking) to data. That data can be leveraged by clients directly for on-premises options and is used by the managed service Encryption API 603. The response from the OC Encryption Toolkit 803 is a secured version of the content, which can be returned to the data consumer 700. Postgres 605 stores data configurations and supporting information inside the OC Infrastructure 809. The DAML Ledger 606 stores data access rules and requirements inside the OC Infrastructure 809.

Figure 9:
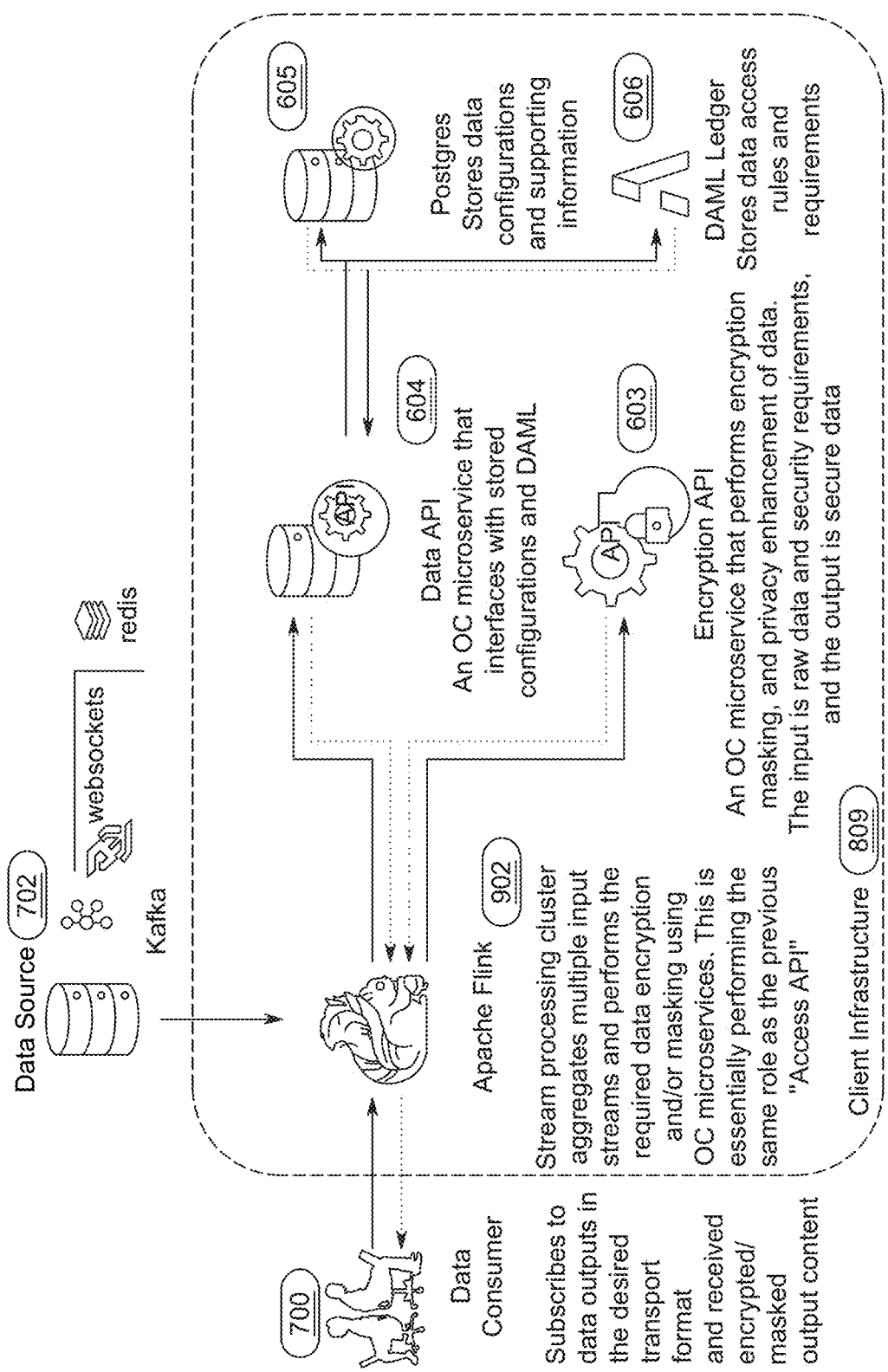
FIG. 9 is a diagram overview of the secure data consumption through streaming component of the present invention.

FIG. 9 diagrams the secure data consumption through the streaming component of the present invention. A data consumer 700 can access and consume data being secured by OC through the OC infrastructure 809. The data source 702 can provide the data being accessed in a secure way. Apache Flink 902 can stream processing cluster aggregates in multiple input streams and perform the required data encryption and/or masking using Encryption API 603. Apache Flink 902 is configured to connect to the distributor's data source 702. Apache Flink 902 performs a check of data protection rules for the given message. The Data API 604 returns the decision and security rules to apply. The Data API 604 is an OC microservice that interfaces with stored configurations and the DAML Ledger 606. The DAML Ledger 606 stores data access rules and requirements. Postgres 605 stores data configurations and supporting information. The response is a secured version of the content, which can be returned to the data consumer 700.

Figure 10:
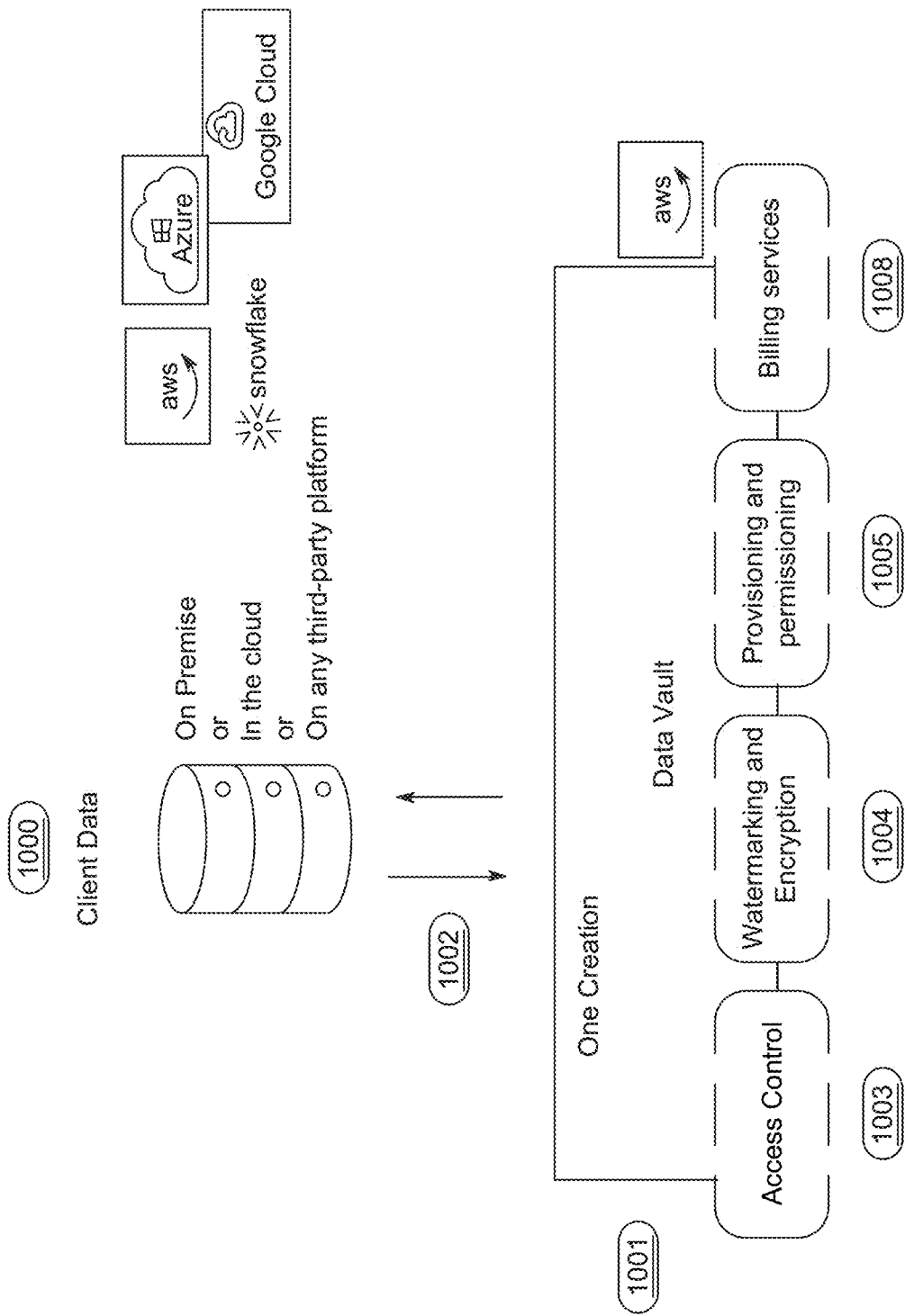
FIG. 10 is a diagram overview of the integration component of the present invention.

FIG. 10 diagrams the integration component of the present invention. In accordance with the present invention, client data 1000 can be on premise, in the cloud, or on any third-party platform. The client metadata 1002 is sent to One Creation's data vault 1001 via API or files. In the preferred embodiment, services can run on client's metadata wherever its location is. The One Creation data vault 1001 consists of an access control point 1003, watermarking and end-to-end encryption 1004, provisioning and permissioning 1005, and billing services 1006. The client receives data from One Creation via API or files from the original API.

Figure 11:
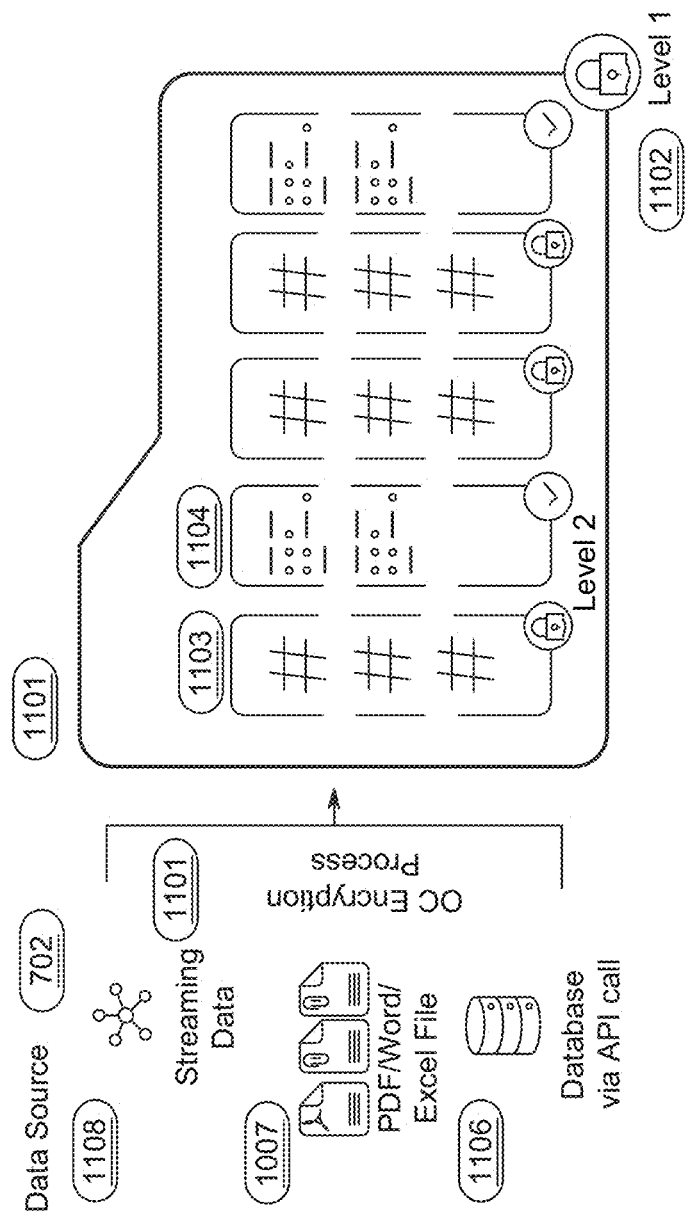
FIG. 11 is a diagram overview of the data delivery and encryption options component of the present invention.

FIG. 11 diagrams the data delivery and encryption options component of the present invention. The OC encryption process 1100 sends data to the system 1101. 1101 represents the entirety of the protected output data from this method and system. This file envelope is distributed to data consumers 700 as a secure package. The primary file protection 1102 represents the encryption and/or data protection method used to secure the full file envelope labeled as 1101. Upon decryption, the payload of this file is made available to end-users. When the access session is finished, the encryption envelope can be re-encrypted on behalf of the key owner using techniques such as proxy re-encryption. This optional re-encryption step provides another layer of security by re-securing after each instance of data access. The data field 1103 represents the ability to provide a second layer of security by optionally protecting (via masking, differential hashing, etc.) field-level content. As a result, the entire file envelope itself may be protected (1101, 1102), and once decrypted, subfields may remain protected for additional security, reduced file-size, increased performance, and other benefits. Similar to the overall security envelope described by 1102, when the access session is finished, the field-level data can be re-encrypted or re-masked on behalf of the key owner using techniques such as proxy re-encryption. This optional re-encryption/re-masking step provides another layer of security by re-securing after each instance of data access. The data field 1104 represents the ability to not provide a second layer of security for certain sub-fields. The data field represented by 1104 does not have the same secondary protection as the data field represented by 1103, and as a result, the data field represented by 1104 would be directly accessible once the primary file protection (1101, 1102) is decrypted. The data source 702 may be streaming data 1108. The data source 702 may also be a PDF, word, or excel file 1107. In one embodiment of the present invention, the data source 702 may be a database via API call 1106.

Figure 12:
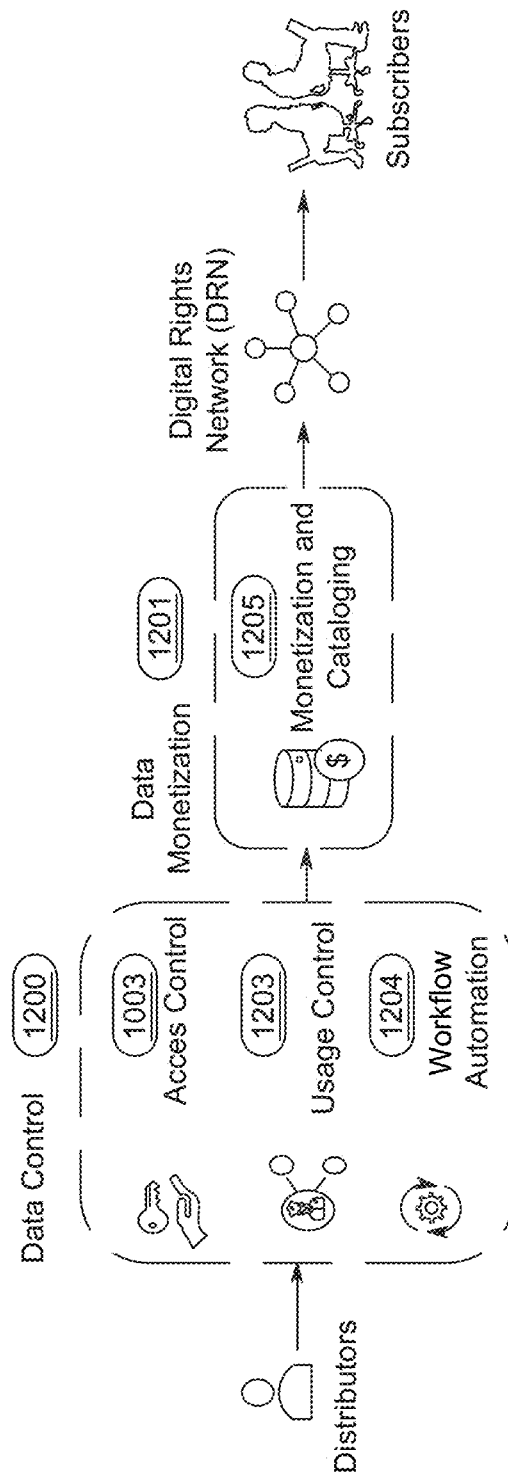
FIG. 12 is a diagram overview of the Digital Rights Enforcement and Management (DREAM™) Fabric component of the present invention.

FIG. 12 outlines the Digital Rights Enforcement and Management (DREAM™) Fabric component of the present invention. The Data Control 1200 component encompasses access control 1003, usage control 1203, and workflow automation 1204. The Data Monetization 1201 component encompasses monetization and cataloging 1205 data distribution through the users data rights network (DRN).

Figure 13:
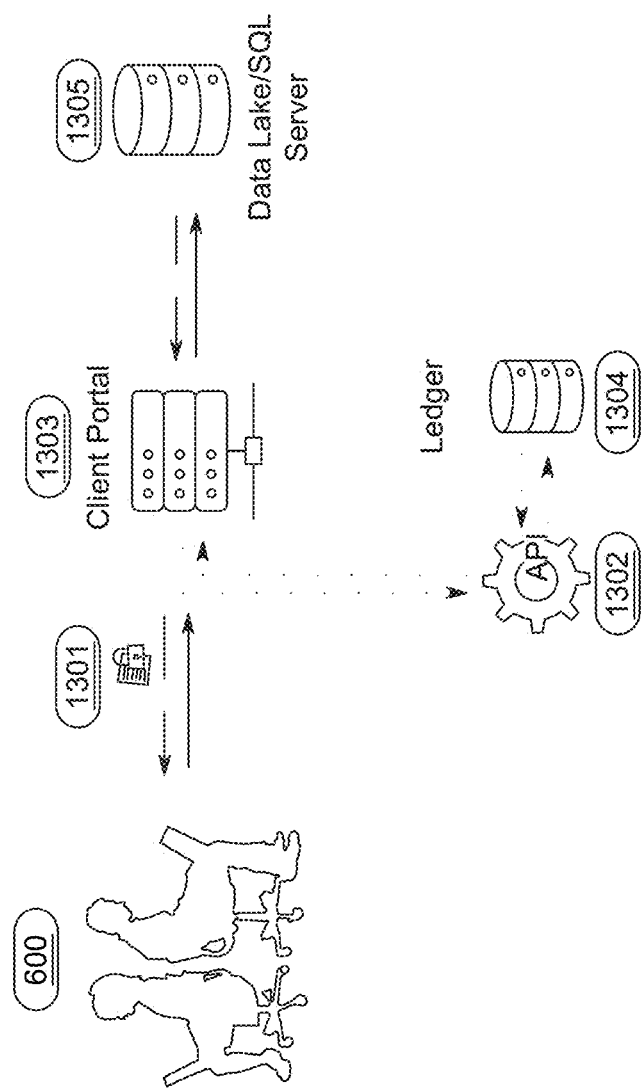
FIG. 13 is a diagram overview of the file transfer protocol (FTP) through SmartMarket Workflow component of the present invention.

FIG. 13 diagrams the file transfer protocol (FTP) through SmartMarket Workflow component of the present invention. The user 600 can log into the Client portal 1303 to select a file or set of data attributes to download. The portal server queries OC's control API 1302. OC's control API 1302 returns file content and attribute level entitlements and encryption instructions to the FTP server. The control API 1302 may communicate with the ledger 1304. The Client portal 1303 may send and retrieve data from the Data Lake/SQL Server 1305. The original download request can be transformed into instructions. The portal server can apply OC instructions to the provisioned files and data before sending the files and data to the user 600. This process can be done either by the user 600 or via an OC toolkit, SDK, or on-premises service. The user 600 can then view the set of restricted files and data securely 1301.

Figure 14:
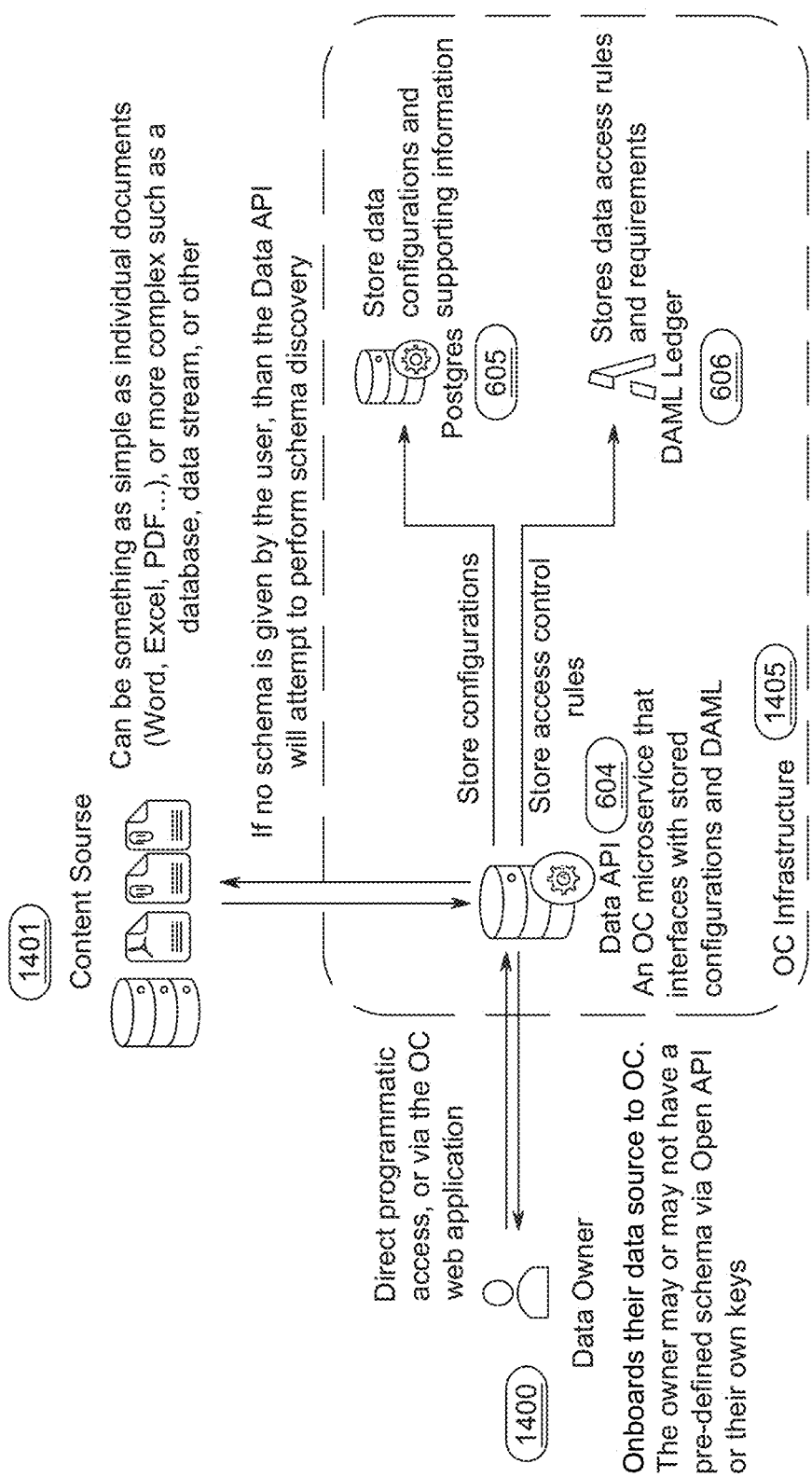
FIG. 14 is a diagram overview of the data source onboarding component of the present invention.

FIG. 14 diagrams the data source onboarding component of the present invention. The data owner 1400 can onboard their data source to the OC infrastructure 1405. The data owner 1400 may or may not have a predefined schema via Open API or their own keys. The data owner 1400 can have direct programmatic access to the Data API 604 or access via the OC web application. The content source 1401 can be an individual word, excel, or PDF document, or a more complex content source such as a database or data stream. If no schema is given by the data owner 1400, the Data API 604 will attempt to perform schema discovery. The Data API 604 can be an OC microservice that interfaces with stored configurations and the DAML ledger 606. The Data API 604 stores configurations and access control rules for Postgres 605 and the DAML Ledger 606 to retrieve. Postgres 605 can store data configurations and supporting information. The DAML Ledger 606 can store data access rules and requirements.

Figure 15:
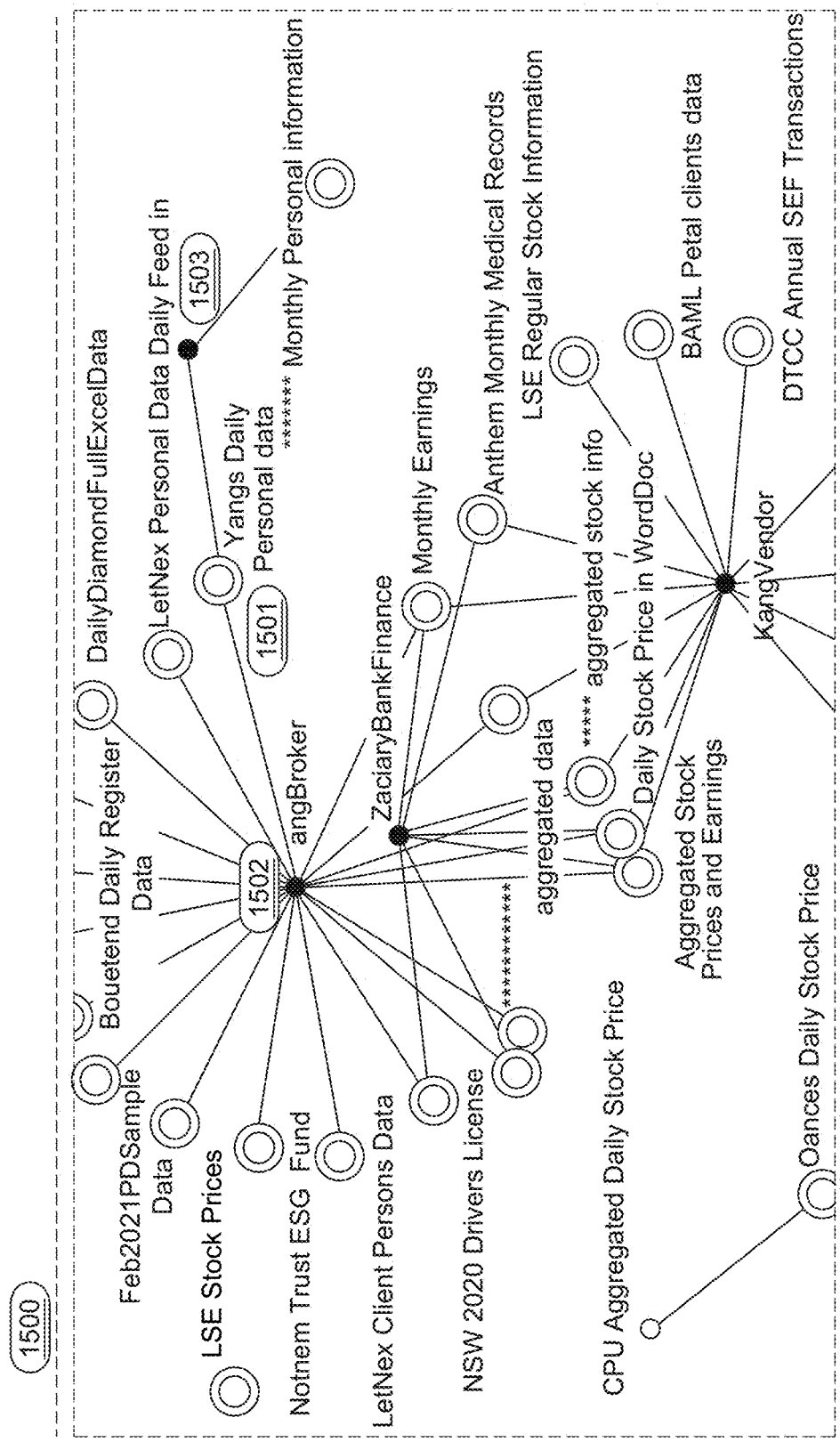
FIG. 15 is a line diagram illustrating a decentralized network.

FIG. 15 is a line diagram illustrating a decentralized network. In accordance with the preferred embodiment of the present invention, the specific architecture of the network can be either decentralized or distributed. FIG. 15, generally represented by the numeral 1500, provides an illustrative diagram of the decentralized network. FIG. 15 depicts each node with a dot 1502 Under this system, each node is connected to at least one other node 1501. Only some nodes are connected to more than one node 1503.

Figure 16:
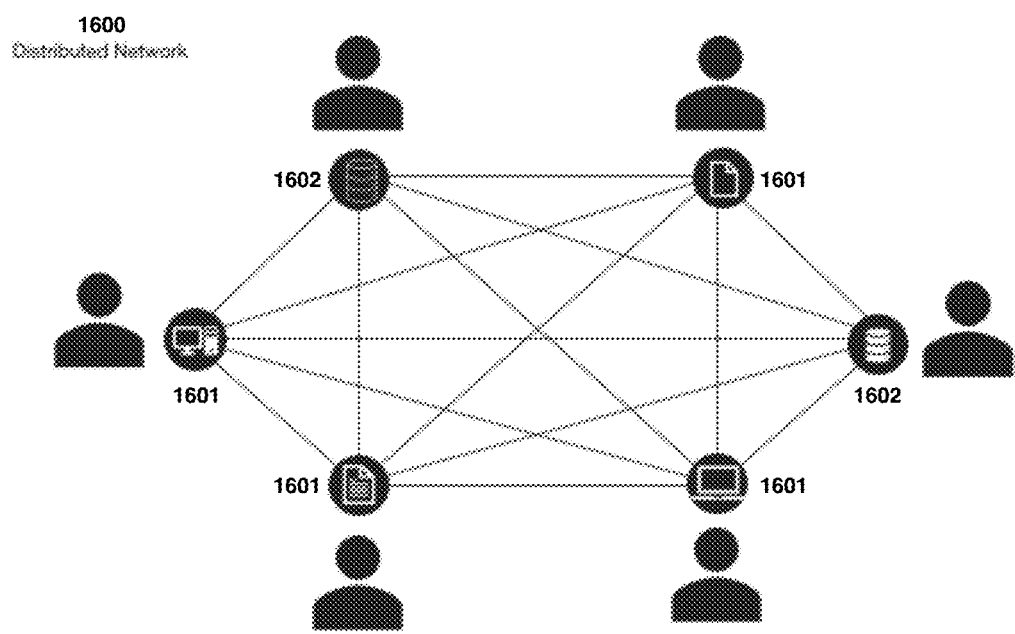
FIG. 16 is a line diagram illustrating a distributed network.

FIG. 16 is a line diagram illustrating a distributed network. For comparison purposes, FIG. 16, which is generally represented by the numeral 1600, illustrates a distributed network. Specifically, the illustration shows the interconnection of each node in a distributed decentralized network 1600. In accordance with the preferred embodiment of the present invention, each node 1602 in the distributed network 1600 is directly connected to at least two other nodes 1601. This allows each node, for example a computer, 1601 to transact with at least one other node, for example a database, 1602 in the network. The present invention can be deployed on a centralized, decentralized, or distributed network. According to the present invention, each node, such as a computer 1601, may be a personal computer or wireless device. Such computers 1601 typically also include input and output devices for various users. In that manner, certain input and output devices may be used to capture biometric data about a user, for example a microphone can be used to capture a voiceprint, or a camera can be used to capture an image associated with a participating user. Furthermore, nodes or computers 1601 will be aware of their geographical position upon the earth, for example, by way of a Global Positioning Device (GPS). Accordingly, GPS data may become associated with any particular user according to the current invention, so that a user's biometric data and geo-location data may be used for data security purposes. Additionally, biometric data and geolocation data may be associated with a network 1600 according to the present invention. In addition, user biometric data or geolocation data may be stored within the node or database 1602, which will then be distributed through the DREAM™ Fabric 101.

Figure 17:
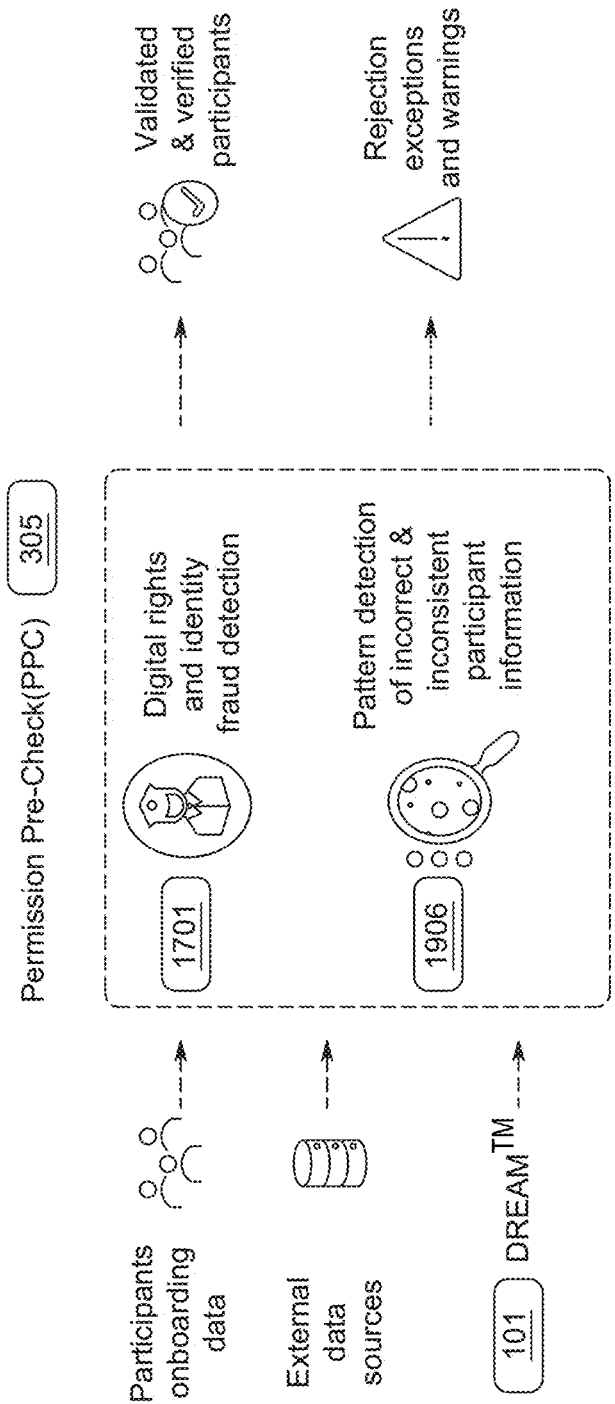
FIG. 17 is a diagram overview of an embodiment of the permission pre-check (PPC) process of the present invention.

FIG. 17 diagrams an embodiment of the permission pre-check (PPC) 305 process of the present invention. In some embodiments, a machine learning module may be trained to identify fraud detection 1701. In a preferred embodiment, internal and external participant onboarding, biometric, and geolocation data may be input into a machine learning module 1906 to identify or detect incorrect and inconsistent information patterns based on signals from the DREAM™ Fabric 101.

Figure 18:
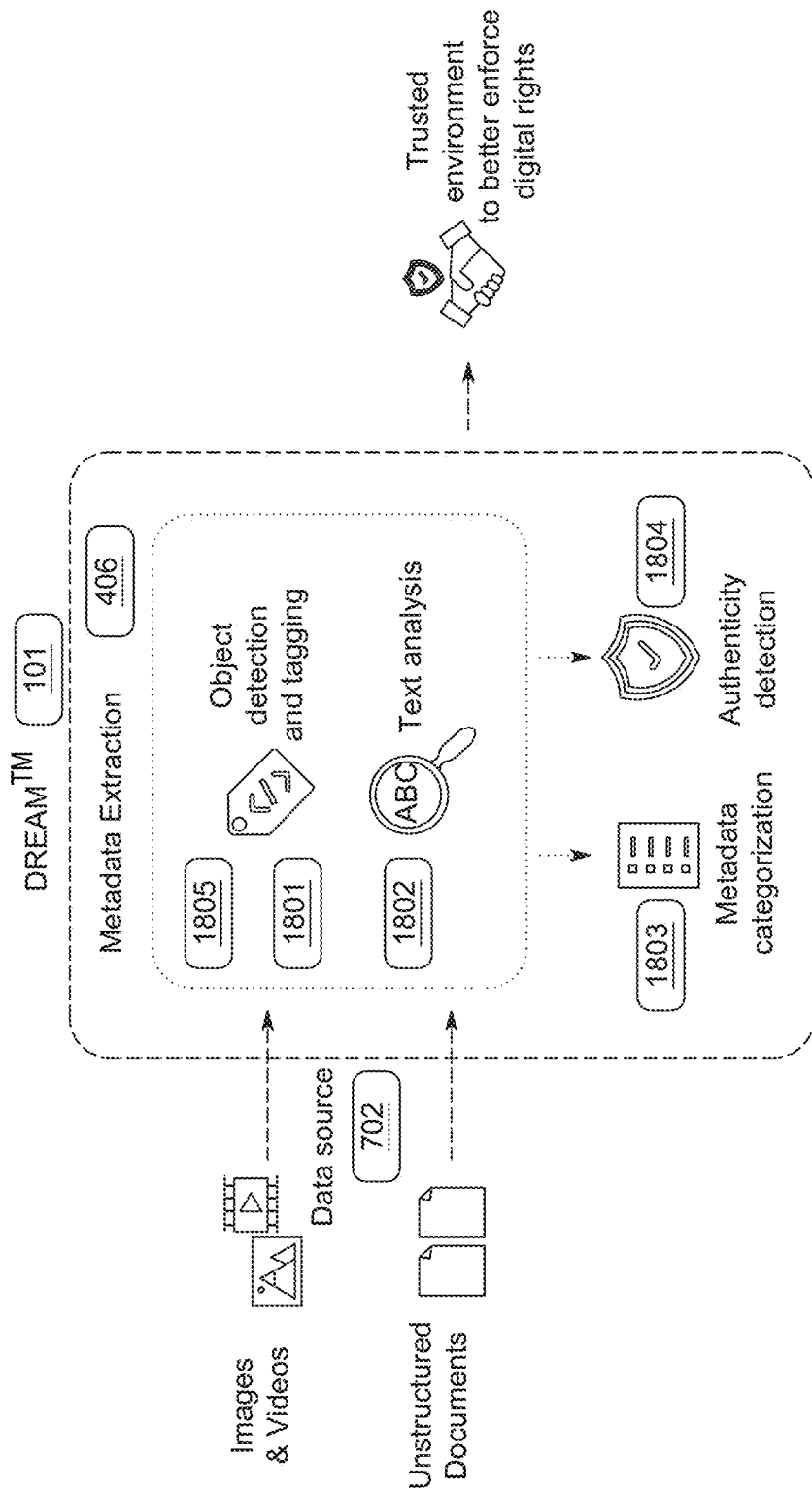
FIG. 18 is a diagram overview of an embodiment of the metadata extraction component of the present invention.

FIG. 18 diagrams an embodiment of the metadata extraction 406 component of the present invention. In one embodiment, during setup of the data source 702 on the DREAM™ Fabric 101, a machine learning module and pattern recognition module 1805 may facilitate a plurality of features. In some embodiments, the machine learning and pattern recognition module may facilitate object detection in images or videos 1801, text analysis in unstructured documents 1802, metadata grouping and categorization and contextual matching for reorganization or the re-architecture of digital rights 1803, and authenticity validation 1804.

Figure 19:
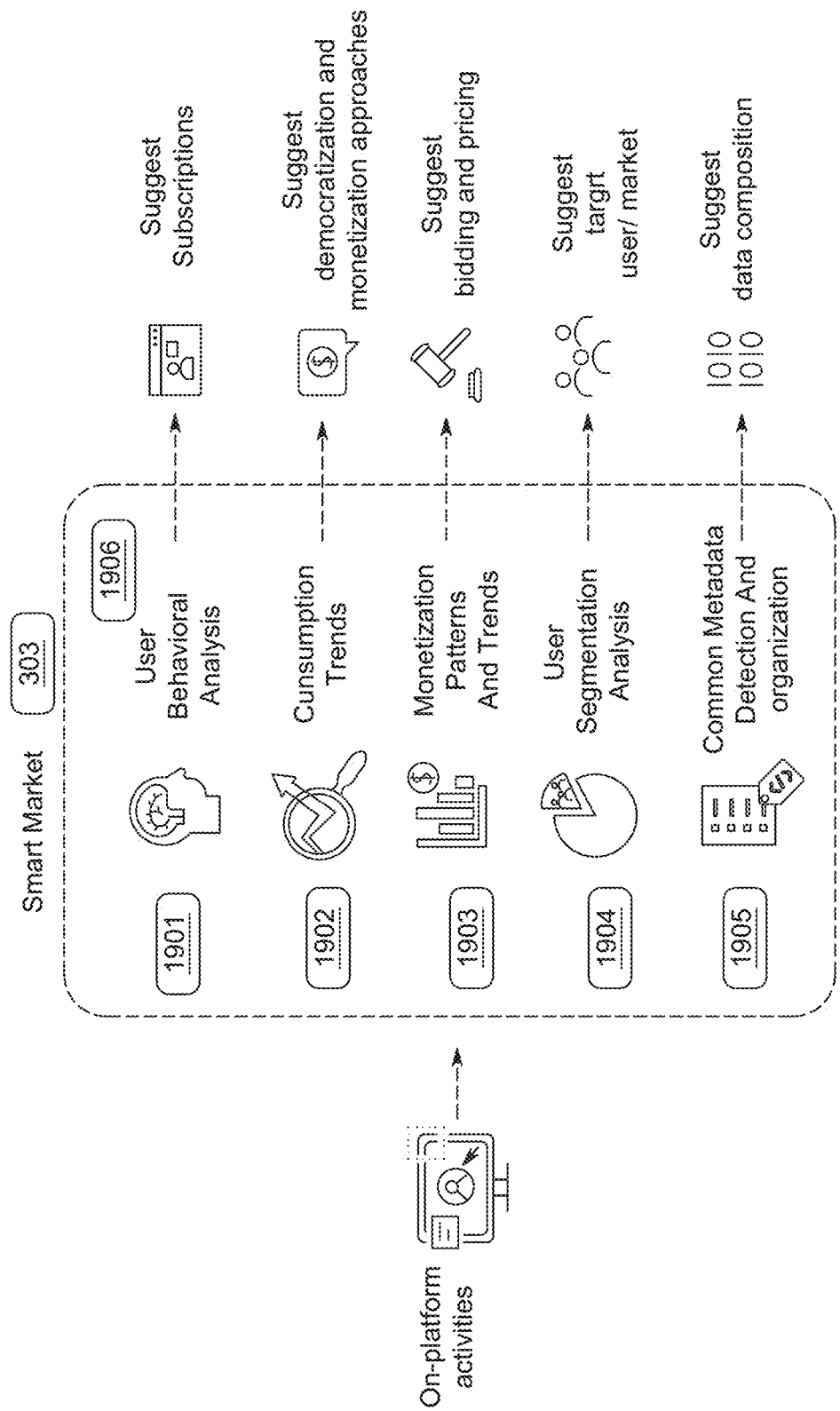
FIG. 19 is a diagram overview of an embodiment of the SmartMarket workflow component of the present invention.

FIG. 19 diagrams an embodiment of the SmartMarket 303 workflow component of the present invention. As distributors provide more data, the value of the data compounds. In some embodiment, the machine learning module 1906 may perform a plurality of functions to enhance data privacy and data quality. In one embodiment, the machine learning module 1906 may include user behavioral analysis 1901. The behavioral analysis 1901 may learn the preferences of subscribers and suggest relevant Applications. In one embodiment, the machine learning module 1906 may include consumption trends 1902. The machine learning module 1906, based on consumption trends 1902 may predict and suggest best democratization approaches. In one embodiment, the machine learning module 1906 may include monetization patterns and trends 1903. The machine learning module 1906, based on monetization patterns and trends 1903 on similar Applications may develop suggestions on pricing and bidding. In one embodiment, the machine learning module 1906 may include user segmentation analysis 1904. The machine learning module 1906, based on segmentation analysis 1904 may identify patterns in subscribers who request information or consent. In one embodiment, the machine learning module 1906 may include common metadata detection and organization 1905. The machine learning module 1906, based on common metadata detection and organization 1905 may analyze all encrypted, unencrypted, and masked digital rights requests to identify which fields are being utilized across multiple datasets, and therefore automatically creating composite datasets to prevent the duplication of data.

Figure 20:
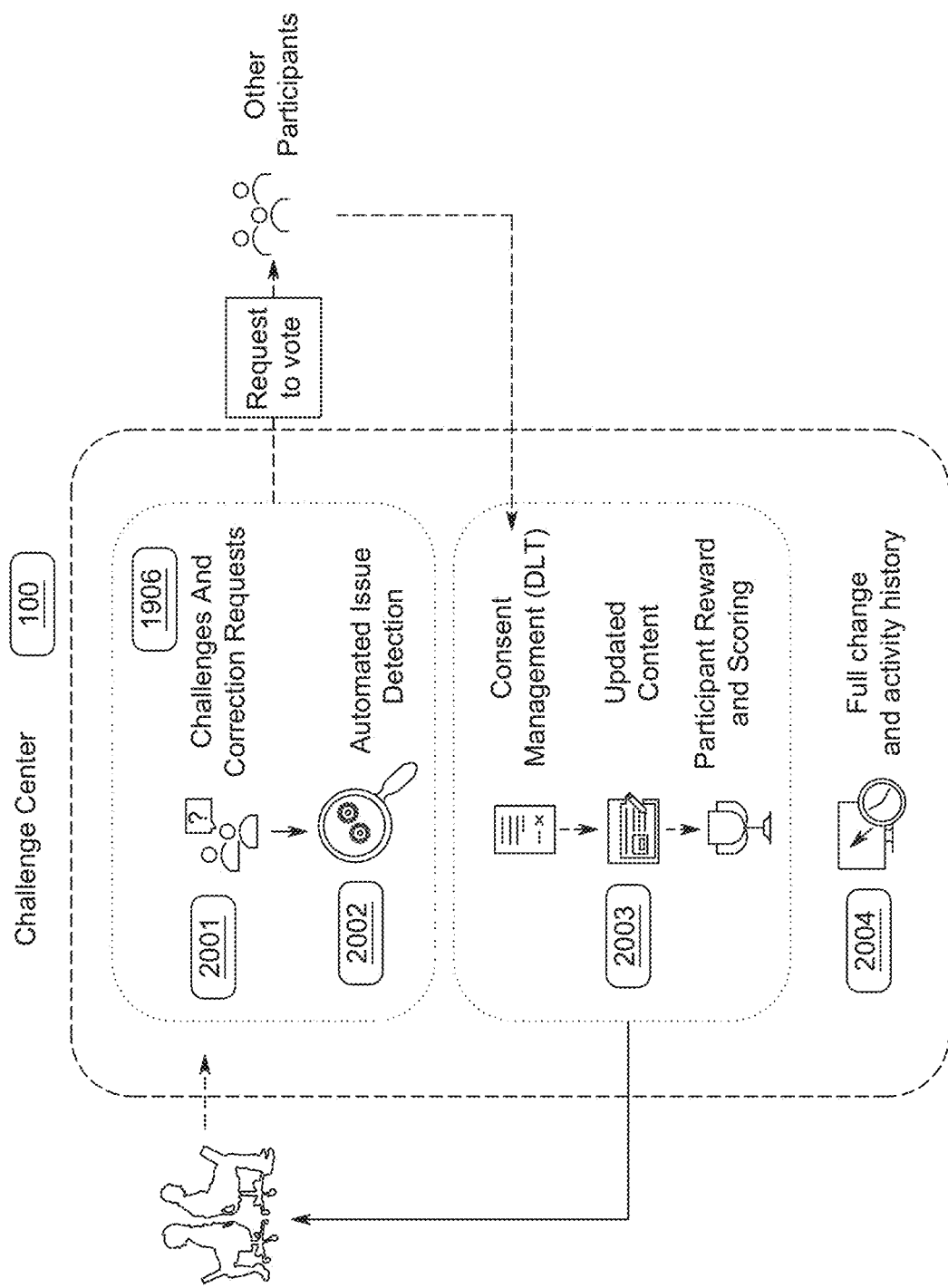
FIG. 20 is a diagram overview of an embodiment of the Challenge Center component of the present invention.

FIG. 20 diagrams an embodiment of the Challenge Center 100 component of the present invention. Based on a pattern of existing content, a machine learning module 1906 may detect potential data and digital rights inconsistencies or violations, and alert all participants. In one embodiment, the Challenge Center 100 may include challenges and correction requests 2001. In the challenge and correction requests 2001, any or all subscribers may raise one or more disputes to challenge or request the correction of a piece of data or content. In one embodiment, the Challenge Center 100 may include automated issue detection 2002. As the Challenge Center 100 processes more corrections, a machine learning module 1906 may be trained on patterns to predict potential issues and automatically flag the potential issues to all participants in the automated issue detection 2002. Issues raised by the automated issue detection 2002 may include, but are not limited to, incorrect information, misinformation, and inappropriate content. In one embodiment, all subscribers may be invited to vote and express their opinion on the content being challenged in the Challenge Center 100. Additionally, the distributor may approve or deny the changes to the content being challenged in the Challenge Center 100. In a preferred embodiment, once the change is approved, all subscribers may receive the corrected information 2003. In one embodiment, the amount of accepted corrections a subscriber has correlates to a subscriber's contribution score. The amount of declined corrections a subscriber has may correlate to a lower contribution score. Further, the more accepted corrections a distributor has correlates to a trusted content score. In one embodiment, the contribution and trusted content scores may be linked to a point or token system wherein top contributors are rewarded with discounts on the platform or other types of rewards to encourage positive participation. In one embodiment, the full change and activity history 2004 may be saved. In some embodiments, all participants may have a timeline view of the full change and activity history 2004, and have visibility into when content has been updated, what content was updated, and whom the content was updated by.

Figure 21:
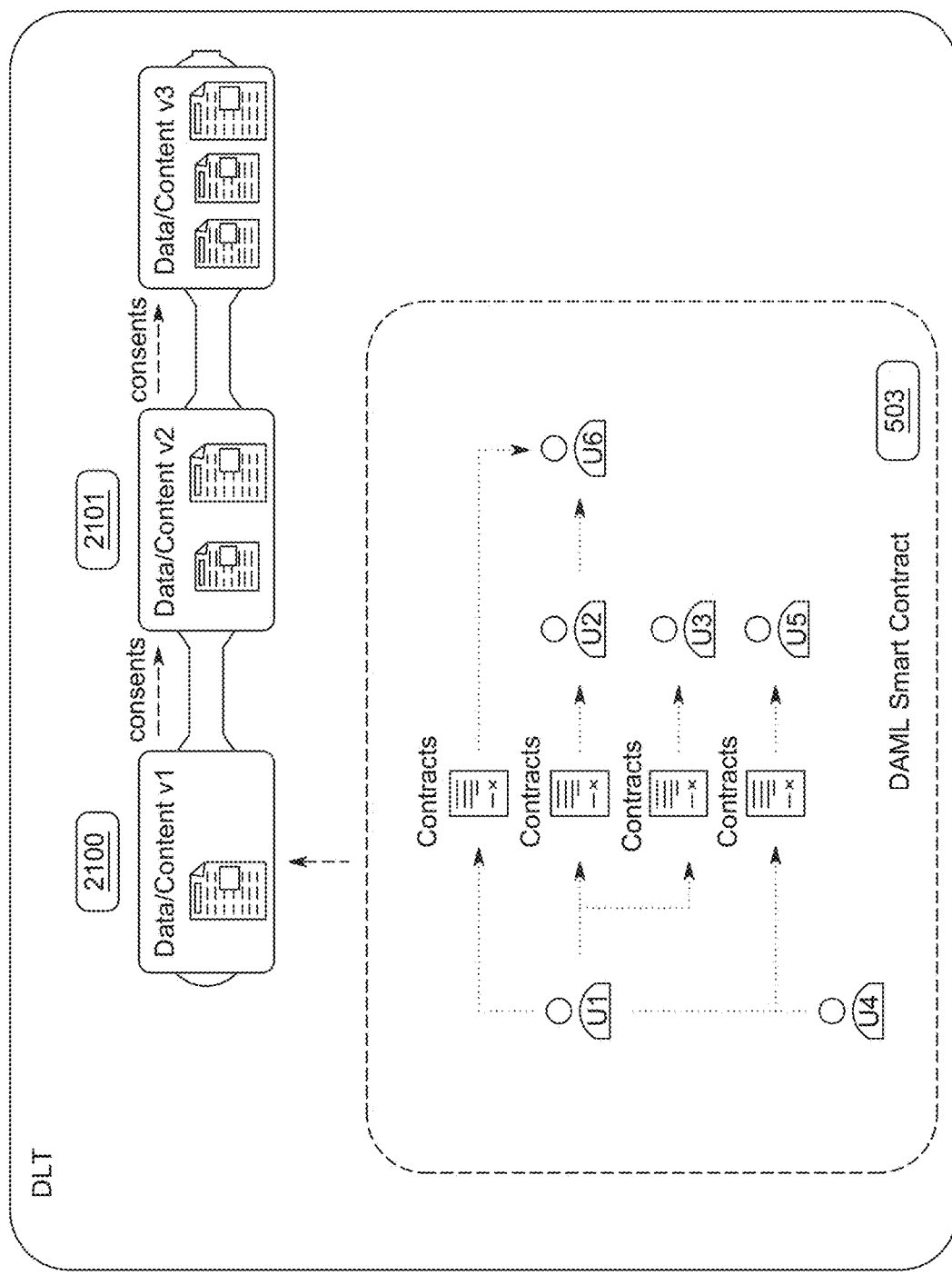
FIG. 21 is a diagram overview of an embodiment of distributed ledger technology (DLT) technical components of the present invention.

FIG. 21 diagrams distributed ledger technology (DLT) technical components of the present invention. In one embodiment, the reference to the data/content 2100 may be held in a block. Updates to the data/content 2100 may result in a new block 2101 on the permissioned chain, and the original reference to the data/content 2100 may be archived. In some embodiments, the new block 2101 may contain a reference to the updated vault with the history of changes. In one embodiment, DAML Smart Contracts 503 may interact with the blocks 2100 and 2101.

The method and apparatus of the present invention provide a needed solution for data digital rights ownership, processing, and distribution, and, more particularly, to a method and apparatus for automated digital rights management workflows and the use of Smart Contracts to manage and enforce digital rights across multiple ecosystems. Today, people provide their data to others, often with no conception of what rights they may be relinquishing, with no ability to control what others may do with their data and may be forfeiting the ability to monetize their own data. Data is mostly given to aggregators and entities such as, for example without limitation, Bloomberg, Google, Facebook, or the like. These aggregators and entities may then distribute the data on behalf of the owner, or in some cases, for their own benefit and profit. Some aggregators and entities, and many people providing their data, lack not only an automated way to distribute data to people they do not know, but also a way to automate the process of provisioning and monitoring data for the purpose of consumption in real time or on the fly once the data or rights have been consumed and passed onto the next generation of users.

The present invention may resolve the important problems of the blurring of data ownership and distribution, and other potential problems caused by data owners 1400 providing their data to others, with inadequate appreciation and control over the possible uses or monetization of the data. The method and apparatus of the present invention may provide an automated process of distributing data to people they do not know which may safeguard the data and provide an unprecedented level of trust. The present invention may provide a method and apparatus capable of automating the process of provisioning and monitoring the data for the purpose of consumption in real time, which may require manual and specific onboarding only to known vetted persons, parties or entities.

In an exemplary embodiment, the method and apparatus of the present invention may provide a solution to these problems, which may comprise requiring manual onboarding as a prerequisite or condition precedent to receiving data. In some embodiments, the method and apparatus may comprise manual and specific onboarding only to people that are known or vetted prior to being provided any data. In a further embodiment, a method and apparatus of data governance in accordance with the present invention may be capable of achieving or providing secure and trustless data provisioning and distribution of data. The data types supported for onboarding can be documents (Word, Excel, PDF), arbitrary data, image, or video data. The data to be onboarded may be transported through a single file, API request or response, or real time reaming. In some embodiments, the client may register and login to the Graphical User Interface (GUI), where as part of the registration process, client data may be captured and verified against external official sources. In a further embodiment, the client may invite other users to onboard data from the GUI. Verified and authenticated clients may configure and retrieve metadata and provision rules via GUI, API, real time stream, and toolkit installation on premise where user setup is connected to a local SQL/Non-SQL database. In a further embodiment, clients may distribute data and digital content via One Creation as the vault by uploading data directly to One Creation via a GUI or API. Data and digital content remains at the clients location. When the subscriber is ready to receive provisioned data or content, One Creation may open a secure connection to the distributor via a GUI, API, or real time stream Toolkit connection. The system of the present invention may be provided on a distributed ledger technology (DLT) or a centralized database (DB). In one embodiment, the system may comprise a DLT further comprising IBM Fabric, Intel Sawtooth, R3 Corda, Besu, VMware Concord, Ethereum or BFT (Byzantine Fault Tolerant) DLT.

In an exemplary embodiment of the present invention, the method and apparatus may provide data governance, provisioning and distribution which may be automated and monitored by a smart contract layer built in DAML. The data may be stored in a centralized database or data lake anywhere. Data is encrypted end to end, in rest and in transit. A Smart Contract 200 layer may sit and integrate on top of the DB API and may be responsible for the sole control of the owner's data rights.

In an exemplary embodiment, the method and apparatus of the present invention may use Smart Contract 200 technology, which may comprise at least one bot/smart contract capable of serving as a major enabler for automation of the creation of digital rights contracts in real time. Digital rights contracts will track the parties privy to the data, the legal rights and obligations of such parties, the value of the digital rights data, and the automatic provisioning of digital rights data based on the rules set in advance by the digital rights data owner. The Smart Contract layer 200 will further assess the transfer of digital rights data in exchange for value and re-encrypt the digital rights data as it moves to the next generation of digital rights data subscribers. Smart Contracts 200 allow for Attribute Level Rights Provisioning 300 and Attribute level automatic consent management, meaning both automation and granularity of provisioning consent. The Smart Contract 200 technology may automatically define parties to the digital data rights and define rules, rights, and obligations between the parties. The Smart Contract layer 200 may further define publishing and consumption rules, allowing data contributors to define permissions to their data rights. Data contributors may then specify pricing rules 202 in the Smart Contract layer 200. The Smart Contract layer 200 of the present invention may automatically provision digital data rights, automate consent to an outside request to view the digital data, and enforce digital data rights throughout the lifespan of the data in any further ecosystem. The Smart Contract layer 200 of the current invention allows for tracking, control, and enforcement of rights even beyond the first generation/ecosystem of users. In a further embodiment, provision rules are stored on the Smart Contract 200 and client onboarding data may be stored in the AWS Postgres database. In an exemplary embodiment, clients may choose One Creation as the data storage database, in addition to provision rules, and One Creation securely stores client data in the AWS environment.

In an exemplary embodiment, the method and apparatus may function or be operated as follows. Data in the environment will be completely encrypted end to end in rest and in transit. The use of smart contracts in accordance with the method and apparatus of the present invention, to automate workflows and to digitize any legal contract or obligation may provide a unique opportunity in data distribution and ownership. These contracts in accordance with the present invention may enable multiple designated parties to view the same data object but be limited in terms of access or what they may see and do with the data. Smart contracts have been generally only available as part of a built-in logic of underlying distributed ledger technologies (DLT), such as, for example without limitation, Solidity, a smart contract language which only works on the Ethereum DLT framework. The method and apparatus of the present invention may use any suitable programming language. However, the method and apparatus of the present invention may in one embodiment employ a choice for language of DAML as it is an open-source option. The method and apparatus of the present invention may beneficially provide decentralized decision and sharing of data but may also be deployed on a centralized DB. The current invention is agnostic to the location of data, due to the decentralized platform (DLT) and can utilize data in any format, regardless of the underlying digital rights format or frequency of updates. The current invention may provision data or digital content and store data anywhere as long as the schema and structure are known and stored within the DREAM™ Fabric platform in the form on one or more files, on a local computer, in the cloud, on a SQL or Non-SQL database, or in a data warehouse such as Snowflake or Databricks. The data solution built in accordance with the present invention may work and scale all aspects of data ownership and distribution through automation: the data vault may be closely integrated to the marketplace so users may create data "stores" from their data vaults and sell their data. However, if the smart contract layer 200 were not in place, the provisioning of what users could see from the data, the onboarding of users that one does not know and the automation of the transfer of value between parties (such as data for payment) may be completely built into the solution. The method and apparatus of the present invention provides an unprecedented solution comprising all of the aforementioned components working in concert: without all of these components put together, the automated sharing and monetization of data and the ability to create vast data rights networks would have been impossible to scale without a massive manual infrastructure behind the scenes. The current invention is also the only platform to use Smart Contracts on a centralized database. Currently available data rights management platforms are antiquated and require massive manual intervention: the solution provided by the present invention is a marked advance over existing solutions.

In an exemplary embodiment of the present invention, the method and apparatus provide data provisioning, data rights contracts, and access/payment for data in advance of any disclosure, exposure or sale thereof. Data providers are precluded from access to the data prior to completion of the data provisioning, completion of data rights contracts, and prior to payments for the contractually defined access. Data providers are therefore unable to provision the same data set for many types of clients and in a granular manner.

In an exemplary embodiment, the method and apparatus of the present invention may provide a process of automation of the decentralized provisioning, governance, and monetization and/or distribution of data to people or entities the owner of the data does not know or trust. Each subscriber gets assigned automatically the access rules that are relevant to his profile type. The method and apparatus may further comprise the use of smart contracts, and the choice of either a DLT or a centralized database.

No other solution available on the market today has both capabilities. DLT databases are immature and require an extensive change in an organization's IT stack to adopt this kind of service. Due to data size limitations, the solution would not scale on this technology as well as not provide a migration path from current centralized DB infrastructures to the future decentralized digital rights world.

In further embodiments of the present invention, it may be possible to apply established data rights to other data rights ecosystems. Data rights may be applied not only to consuming or distributing data, but also to other applications. Once an automated platform to identify, govern, monetize and distribute data rights has been created, these established data rights may appear in many other data rights ecosystems such as, for example without limitation, autonomous driving and autonomous drones. When an ecosystem of unpredictable participants needs to exchange data between the participants in real time and with automated rules, a data rights platform created in accordance with the method and apparatus of the present invention may be used for the distribution and governance of those rights.

In summary, an exemplary embodiment of the present invention provides a method and apparatus for decentralized, automated data governance, monetization and distribution through trust exchange of value. The inventive method and apparatus may provide data governance, provisioning and distribution which may be automated and monitored by a smart contract layer built in DAML, an open source programming language; and may then use a centralized data lake or database (DB) to store the data. The inventive method and apparatus may further comprise a Smart Contract layer which sits and integrates on top of the DB and may be responsible for the sole control of an owner's data rights.

The computer-based data processing method and apparatus described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the present invention.

In one embodiment, each transaction (or a block of transactions) is incorporated, confirmed, verified, included, or otherwise validated into the blockchain via a consensus protocol. Consensus is a dynamic method of reaching agreement regarding any transaction that occurs in a decentralized system. In one embodiment, a distributed hierarchical registry is provided for device discovery and communication. The distributed hierarchical registry comprises a plurality of registry groups at a first level of the hierarchical registry, each registry group comprising a plurality of registry servers. The plurality of registry servers in a registry group provides services comprising receiving client update information from client devices and responding to client lookup requests from client devices. The plurality of registry servers in each of the plurality of registry groups provide the services using, at least in part, a quorum consensus protocol.

As another example, a method is provided for device discovery and communication using a distributed hierarchical registry. The method comprises Broadcasting a request to identify a registry server, receiving a response from a registry server, and sending client update information to the registry server. The registry server is part of a registry group of the distributed hierarchical registry, and the registry group comprises a plurality of registry servers. The registry server updates other registry servers of the registry group with the client update information using, at least in part, a quorum consensus protocol.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A computer implemented method for data rights management, implemented using at least one or more hardware processors, the method comprising:
    performing decentralized automated data digital rights processing and distribution;
    defining data governance by a database;
    using a smart contract layer integrated on top of a database application programming interface (API) to manage, enforce, monetize, and distribute digital rights across multiple ecosystems simultaneously through a trust exchange of value, the smart contract layer being responsible for a sole control of an owner's digital data rights;
    automating the process of provisioning and monitoring digital data rights for a purpose of consumption in real time includes manual and specific onboarding only to known trusted users;
    authenticating user biometric information captured by an input device to permit user access to the database; and
    processing GPS data associated with the user in addition to the biometric data so that both biometric data and geolocation data are jointly used for data security purposes prior to permitting user access to the database, wherein the authenticating user biometric information and processing GPS data are jointly validated by a plurality of nodes in a distributed network, each node capturing biometric and geolocation data, such that access to the database is permitted only after consensus among the nodes is achieved according to a distributed ledger protocol.

2. A method according to claim 1 wherein said smart contracts for digital rights management are used for digital rights management.

3. A method according to claim 1, further comprising:
    monitoring, via artificial intelligence (AI) monitors the trusted exchange of value; and
    controlling, via the AI, the trusted exchange of value.

4. A method according to claim 1 wherein at least one computer with a user interface facilitates said smart contract, and wherein said computer includes at least one processing unit coupled to a form of memory, a microprocessor, a server, a desktop monitor, and other user interface devices suitable for human biometric identification and facilitation of smart contract execution, for high security assuring, verifying and enabling said users to access, obtain, and enforce said digital rights.

5. A method according to claim 4 wherein data aggregators participate in the execution of said smart contracts.

6. A system for data rights management comprising one or more hardware processors, decentralized automated data digital data rights processing and distribution, data governance defined by a database and a use of smart contracts to manage, enforce, monetize, and distribute digital data rights across multiple ecosystems simultaneously through a trust exchange of value;
    wherein automation of provisioning and monitoring of the digital data rights for a purpose of consumption in real time includes manual and specific onboarding only to known trusted users;
    wherein the system is configured to authenticate user biometric information to permit user access to the database; and
    wherein the system further includes a location verification component, implemented using the one or more hardware processors, configured to process global positioning system (GPS) data associated with the user in addition to the biometric information so that both the biometric information and the GPS data are jointly used for data security purposes prior to permitting access to the database, the biometric information and the GPS data being jointly validated by a plurality of nodes in a distributed network, each of the nodes being configured to capture biometric information and GPS data, such that access to the database is permitted after consensus among the nodes is achieved according to a distributed ledger protocol.

7. A system according to claim 6 wherein said smart contracts for digital rights management are used for digital rights management.

8. A system according to claim 6 wherein artificial intelligence monitors and controls said trust exchange of value.

9. A system according to claim 6 wherein said smart contract a layer integrates with said database and is responsible for the sole control of an owner's data rights.

10. A system according to claim 6 wherein at least one computer with a user interface facilitates said smart contract, and wherein said computer includes at least one processing unit coupled to a form of memory, a microprocessor, a server, a desktop monitor, or other user interface devices suitable for human biometric identification and facilitation of smart contract execution for enabling said users to obtain and enforce said digital rights.

11. A system according to claim 10 wherein data aggregators participate in the execution of said smart contracts.

12. A system for data rights management comprising one or more hardware processors, decentralized automated data digital rights processing and distribution, data governance defined by a database and the use of smart contracts to manage, enforce, monetize, and distribute digital rights across multiple ecosystems simultaneously through a trusted exchange of value, and wherein said smart contracts for digital rights management of digital data rights are used for digital rights management according to an artificial intelligence monitor and control system for controlling a trusted exchange of value so that users of communication devices may transmit and receive data for which said users are authorized to receive and transmit;

wherein automating the process of provisioning and monitoring the digital data rights for the purpose of consumption in real time includes manual and specific onboarding only to known trusted users;

wherein biometric information is used to permit user access to the database; and wherein the system further includes a location verification component, implemented using the one or more hardware processors, configured to process global positioning system (GPS) data associated with the user in addition to the biometric information so that both the biometric information and the GPS data are jointly used for data security purposes prior to permitting access to the database, the biometric information and the GPS data being jointly validated by a plurality of nodes in a distributed network, each of the nodes being configured to capture biometric information and GPS data, such that access to the database is permitted only after consensus among the nodes is achieved according to a distributed ledger protocol.

13. A system according to claim 12 wherein at least one computer with a user interface facilitates said smart contract, and wherein said computer includes at least one processing unit coupled to a form of memory, a microprocessor, a server, a desktop monitor, or other user interface devices suitable for human biometric identification and facilitation of smart contract execution, for enabling said users to obtain and enforce said digital rights.

14. A system according to claim 12 wherein data aggregators participate in the execution of said smart contracts.

* * * * *